US012499832B2

(12) United States Patent
Lee et al.

(10) Patent No.: US 12,499,832 B2
(45) Date of Patent: Dec. 16, 2025

(54) PIXEL AND DISPLAY DEVICE

(71) Applicant: Samsung Display Co., Ltd., Yongin-Si (KR)

(72) Inventors: Ji Young Lee, Yongin-si (KR); So Hae Kim, Yongin-si (KR); Hyun Young Choi, Yongin-si (KR); Sang Gu Lee, Yongin-si (KR); Hyung Uk Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/794,735

(22) Filed: Aug. 5, 2024

(65) Prior Publication Data

US 2025/0054444 A1 Feb. 13, 2025

(30) Foreign Application Priority Data

Aug. 11, 2023 (KR) ........................ 10-2023-0105457

(51) Int. Cl.

| | |
|---|---|
| ***G09G 3/3233*** | (2016.01) |
| ***G09G 3/32*** | (2016.01) |
| ***G09G 3/3266*** | (2016.01) |
| ***G09G 3/3291*** | (2016.01) |

(52) U.S. Cl.

CPC ............. *G09G 3/3233* (2013.01); *G09G 3/32* (2013.01); *G09G 3/3266* (2013.01); *G09G 3/3291* (2013.01); *G09G 2300/0426* (2013.01); *G09G 2310/0267* (2013.01); *G09G 2310/0275* (2013.01)

(58) Field of Classification Search

CPC ...... G09G 3/3233; G09G 3/32; G09G 3/3266; G09G 3/3291; G09G 2300/0426; G09G 2300/043; G09G 2300/0852; G09G 2310/0267; G09G 2310/0275; G09G 2310/08; G09G 2330/021

See application file for complete search history.

(56) References Cited

U.S. PATENT DOCUMENTS

| | | | | |
|---|---|---|---|---|
| 7,561,124 B2 | 7/2009 | Kwak et al. | | |
| 10,127,859 B2 * | 11/2018 | Chang | .................. | G09G 3/3233 |
| 10,885,848 B2 * | 1/2021 | Wu | ...................... | G09G 3/3258 |
| 11,250,787 B2 * | 2/2022 | Sun | ...................... | G09G 3/3233 |
| 2004/0145547 A1 * | 7/2004 | Oh | ...................... | G09G 3/3233<br>345/76 |

(Continued)

FOREIGN PATENT DOCUMENTS

KR 10-0686334 B1 2/2007

*Primary Examiner* — Christopher E Leiby
(74) *Attorney, Agent, or Firm* — Innovation Counsel LLP

(57) ABSTRACT

A pixel according to embodiments of the present disclosure includes a first transistor having a gate electrode connected to a first node, a first electrode connected to a first power source line, and a second electrode connected to a second node; a second transistor connected between a data line and a third node and having a gate electrode electrically connected to a first scan line; a third transistor connected between the second node and the third node and having a gate electrode electrically connected to a second scan line; a first capacitor connected between the first node and the third node; and a light emitting element connected between the second node and a second power source line.

20 Claims, 18 Drawing Sheets

(56) References Cited

U.S. PATENT DOCUMENTS

| | | | | |
|---|---|---|---|---|
| 2004/0196223 | A1* | 10/2004 | Kwon | G09G 3/3233 345/82 |
| 2006/0220580 | A1* | 10/2006 | Omata | G09G 3/3241 315/169.3 |
| 2016/0307501 | A1* | 10/2016 | Han | G09G 3/3233 |
| 2019/0213957 | A1* | 7/2019 | Gao | G09G 3/3233 |
| 2021/0027701 | A1* | 1/2021 | Park | G09G 3/3233 |
| 2021/0225266 | A1* | 7/2021 | Hyun | G09G 3/3233 |
| 2021/0233470 | A1* | 7/2021 | Tao | G09G 3/3233 |
| 2021/0312861 | A1* | 10/2021 | Wang | G09G 3/3233 |
| 2022/0375408 | A1* | 11/2022 | Dong | G09G 3/3241 |
| 2023/0133704 | A1* | 5/2023 | Gai | G09G 3/20 345/691 |
| 2023/0222974 | A1* | 7/2023 | Qiu | G09G 3/3233 345/204 |
| 2023/0343293 | A1* | 10/2023 | Gai | G09G 3/3233 |
| 2024/0087514 | A1* | 3/2024 | Feng | G09G 3/3275 |
| 2024/0274072 | A1* | 8/2024 | Li | G09G 3/3233 |
| 2024/0304142 | A1* | 9/2024 | Yu | G09G 3/3208 |
| 2025/0006097 | A1* | 1/2025 | Heo | G09G 3/2007 |

* cited by examiner

PIXEL AND DISPLAY DEVICE

CROSS-REFERENCE TO RELATED APPLICATION

The application claims priority to and the benefit of Korean Patent Application No. 10-2023-0105457 filed Aug. 11, 2023, which is hereby incorporated by reference.

BACKGROUND

Field

The present disclosure relates to a pixel and a display device including the same.

Discussion

As information technology develops, the role of a display device as a connection medium between a user and information becomes increasingly important. As a consequence, there is increasing reliance on display devices such as a liquid crystal display device and an organic light emitting display device.

Recently, a high-resolution display panel is required for various display devices including a head-mounted display device (HMD).

SUMMARY

The present disclosure provides a pixel applicable to a high-resolution display panel and a display device including the same.

A pixel according to embodiments of the present disclosure may include a first transistor having a gate electrode connected to a first node, a first electrode connected to a first power source line, and a second electrode connected to a second node; a second transistor connected between a data line and a third node and having a gate electrode electrically connected to a first scan line; a third transistor connected between the second node and the third node and having a gate electrode electrically connected to a second scan line; a first capacitor connected between the first node and the third node; and a light emitting element connected between the second node and a second power source line.

According to an embodiment, the pixel may further include a fourth transistor connected between the first node and the second node and having a gate electrode electrically connected to a third scan line; and a fifth transistor connected between the second node and the light emitting element and having a gate electrode electrically connected to an emission control line.

According to an embodiment, the pixel may further include a second capacitor connected between the first power source line and the first node.

According to an embodiment, the pixel may further include a fourth transistor connected between the first node and the second node and having a gate electrode electrically connected to a third scan line; and a fifth transistor connected between the second node and the light emitting element and having a gate electrode electrically connected to an emission control line.

According to an embodiment, a horizontal period in which a data signal is supplied to the pixel may include a first period, a second period, a third period, and a fourth period, a voltage of a reference power source may be supplied to the data line during the first period, the second period, and the third period, and a voltage of the data signal may be supplied to the data line during the fourth period. In addition, the second transistor may be turned on during the first period to the fourth period, and the fifth transistor may be turned off during the first period and the second period.

According to an embodiment, the fifth transistor may be turned off during a portion of a previous period immediately preceding the horizontal period.

According to an embodiment, the fifth transistor may be turned off during the fourth period.

According to an embodiment, the third transistor may be turned on during the first period, the third period, and the fourth period, and the fourth transistor may be turned on during the first period and the second period.

According to an embodiment, the fourth transistor may be turned on during a portion of a previous period immediately preceding the horizontal period.

According to an embodiment, the third transistor may be turned on during the first period and the third period, and the fourth transistor may be turned on during the first period and the second period.

A display device according to embodiments of the present disclosure may include pixels connected to scan lines, data lines, and emission control lines; a scan driver driving the scan lines; a data driver driving the data lines; and an emission driver driving the emission control lines. Among the pixels, a pixel located on an i-th horizontal line (i is a natural number) and a j-th vertical line (j is a natural number) may include a first transistor having a gate electrode connected to a first node, a first electrode connected to a first power source line, and a second electrode connected to a second node; a second transistor connected between a j-th data line and a third node and turned on in response to an enable first scan signal being supplied to an i-th first scan line; a third transistor connected between the second node and the third node and turned on in response to an enable second scan signal is supplied to an i-th second scan line; a first capacitor connected between the first node and the third node; and a light emitting element connected between the second node and a second power source line.

According to an embodiment, a first driving power source may be supplied to the first power source line, and a second driving power source lower than the first driving power source may be supplied to the second power source line.

According to an embodiment, the pixel may further include a fourth transistor connected between the first node and the second node and turned on in response to an enable third scan signal being supplied to an i-th third scan line; and a fifth transistor connected between the second node and the light emitting element and turned off in response to a disable emission control signal being supplied to an i-th emission control line.

According to an embodiment, the pixel may further include a second capacitor connected between the first power source line and the first node; a fourth transistor connected between the first node and the second node and turned on in response to an enable third scan signal being supplied to an i-th third scan line; and a fifth transistor connected between the second node and the light emitting element and turned off in response to a disable emission control signal being supplied to an i-th emission control line.

According to an embodiment, a horizontal period in which a data signal is supplied to the pixel may include a first period, a second period, a third period, and a fourth period, the data driver may supply a voltage of a reference power source to the j-th data line during the first period to the third period, and supply a voltage of the data signal to the j-th data line during the fourth period. In addition, the scan driver may supply the enable first scan signal to the i-th first scan line during the first period to the fourth period, and the emission driver may supply the disable emission control signal to the i-th emission control line during the first period and the second period.

According to an embodiment, the voltage of the reference power source may be set to a higher voltage than the voltage of the data signal, and the voltage of the data signal may be set to a voltage equal to or lower than a voltage of the second driving power source.

According to an embodiment, the emission driver may supply the disable emission control signal to the i-th emission control line during a portion of a previous horizontal period of the horizontal period.

According to an embodiment, the emission driver may supply the disable emission control signal to the i-th emission control line during the fourth period.

According to an embodiment, the scan driver may supply the enable second scan signal to the i-th second scan line during the first period, the third period, and the fourth period, and supply the enable third scan signal to the i-th third scan line during the first period and the second period.

According to an embodiment, the scan driver may supply the enable second scan signal to the i-th second scan line during the first period and the third period, and supply the enable third scan signal to the i-th third scan line during the first period and the second period.

Objects of the present disclosure are not limited to the objects mentioned above, and other technical objects not mentioned will be clearly understood by those skilled in the art from the description below.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
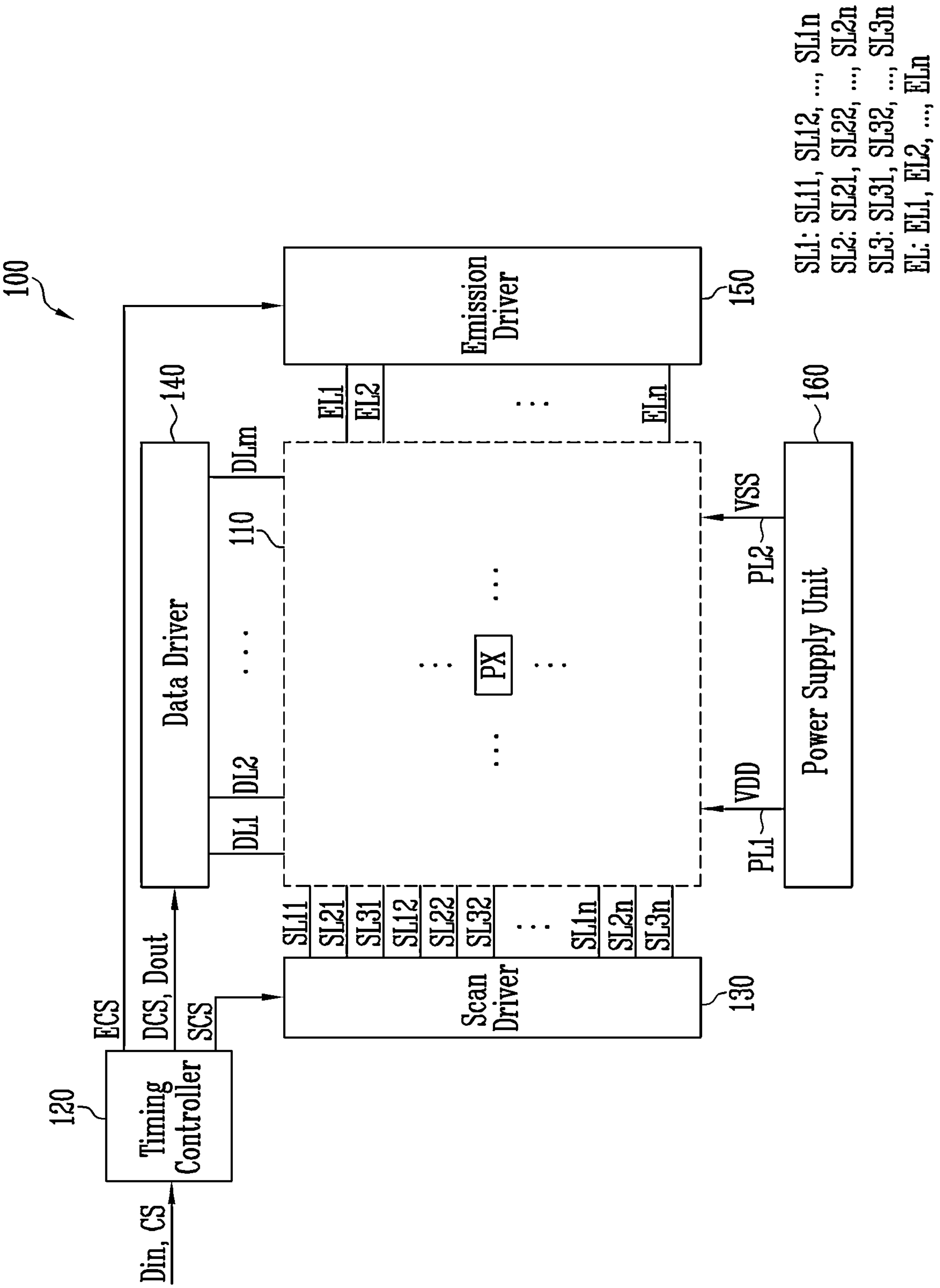
FIG. 1 is a diagram illustrating a display device according to an embodiment of the present disclosure.

Hereinafter, various embodiments of the present disclosure will be described in detail with reference to the accompanying drawings so that those of ordinary skill in the art may easily implement the present disclosure. The present disclosure may be embodied in various different forms and is not limited to the embodiments described herein.

To clearly describe the present disclosure, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present disclosure is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, and may optionally be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

The term "connection" between two components may mean both an electrical connection and a physical connection, but does not necessarily include both types of connections each time disclosure. For example, "connection" used based on a circuit diagram may specifically refer to an electrical connection, and "connection" used based on a cross-sectional view and a plan view may refer to a physical connection without necessarily implying an electrical connection.

Although ordinal terms such as a first, a second, and the like are used to describe various components, these components are not limited to any order or sequence. Ordinal terms are used to distinguish one component from another component. Therefore, a first component described below may be interchanged with a second component within the technical spirit of the present disclosure.

The present disclosure is not limited to the embodiments disclosed below, and may be modified in various forms and may be implemented. In addition, each of the embodiments disclosed below may be implemented alone or in combination with at least one of other embodiments.

Figure 2:
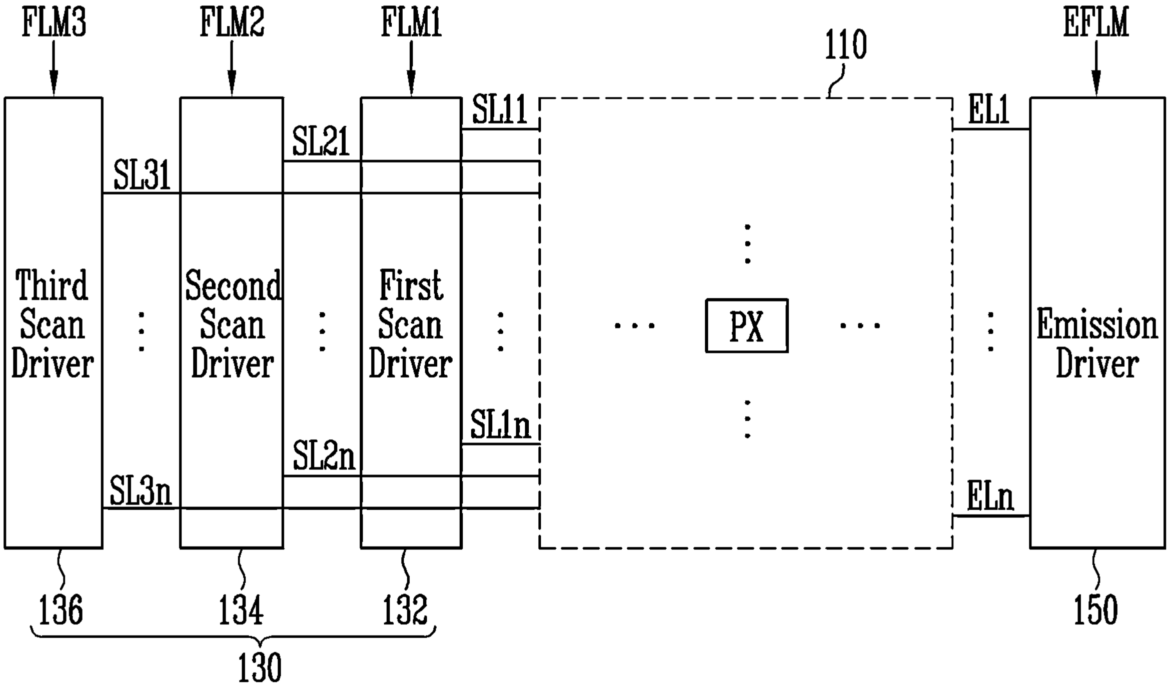
FIG. 2 is a diagram illustrating an embodiment of a scan driver and an emission driver shown in FIG. 1.

FIG. 1 is a diagram illustrating a display device according to an embodiment of the present disclosure. FIG. 2 is a diagram illustrating an embodiment of a scan driver and an emission driver shown in FIG. 1.

Referring to FIG. 1, a display device 100 according to an embodiment of the present disclosure may include a pixel unit 110 (or display panel), a timing controller 120, a scan driver 130, a data driver 140, an emission driver 150, and a power supply unit 160. The above-described components may be implemented as separate integrated circuits, and two or more of the above-described components may be integrated and implemented as one integrated circuit. Also, the scan driver 130 and the emission driver 150 may be formed in the pixel unit 110.

The pixel unit 110 may include pixels PX connected to first scan lines SL11, SL12, . . . , and SL1*n*, second scan lines SL21, SL22, . . . , and SL2*n*, third scan lines SL31, SL32, . . . , and SL3*n*, data lines DL1, DL2, . . . , and DLm, emission control lines EL1, EL2, . . . , and ELn, and power source lines PL1 and PL2, where n and m may be natural numbers.

As an example, a pixel PXij (see FIG. 3) located on an i-th horizontal line (or pixel row) and a j-th vertical line (or pixel column) may be connected to an i-th first scan line SL1*i*, an i-th second scan line SL2*i*, an i-th third scan line SL3*i*, an i-th emission control line ELi, and a j-th data line DLj, where i may be a natural number less than or equal to n, and j may be a natural number less than or equal to m.

In response to an enable first scan signal being supplied to the first scan lines SL11 to SL1*n*, pixels PX may be selected in units of horizontal lines (for example, pixels PX connected to the same scan line may be classified into one horizontal line (or pixel row)). The pixels PX selected by the enable first scan signal may receive a data signal from a data line (any one of DL1 to DLm) connected to the pixels PX. The pixels PX that receive the data signal may generate light with a predetermined luminance in response to a voltage of the data signal.

The scan driver 130 may receive a scan driving signal SCS from the timing controller 120. The scan driving signal SCS may include at least one scan start signal and clock signals necessary for driving the scan driver 130. The scan driver 130 may generate the enable first scan signal, an enable second scan signal, and an enable third scan signal while shifting the scan start signal in response to a clock signal.

To this end, the scan driver 130 may include a first scan driver 132, a second scan driver 134, and a third scan driver 136, as shown in FIG. 2.

The first scan driver 132 may receive a first scan start signal FLM1 and generate the enable first scan signal by shifting the first scan start signal FLM1 in response to the clock signal. The first scan driver 132 may sequentially supply the enable first scan signal to the first scan lines SL11 to SL1*n*. The first scan driver 132 may supply a disable first scan signal to the first scan lines SL11 to SL1*n* when the enable first scan signal is not supplied.

The second scan driver 134 may receive a second scan start signal FLM2 and generate the enable second scan signal by shifting the second scan start signal FLM2 in response to the clock signal. The second scan driver 134 may sequentially supply the enable second scan signal to the second scan lines SL21 to SL2*n*. The second scan driver 134 may supply a disable second scan signal to the second scan lines SL21 to SL2*n* when the enable second scan signal is not supplied.

The third scan driver 136 may receive a third scan start signal FLM3 and generate the enable third scan signal by shifting the third scan start signal FLM3 in response to the clock signal. The third scan driver 136 may sequentially supply the enable third scan signal to the third scan lines SL31 to SL3*n*. The third scan driver 136 may supply a disable third scan signal to the third scan lines SL31 to SL3*n* when the enable third scan signal is not supplied.

The enable first scan signal, the enable second scan signal, and the enable third scan signal may refer to a gate-on voltage at which transistors included in the pixels PX can be turned on. As an example, in a P-type transistor, the enable first scan signal, the enable second scan signal, and the enable third scan signal may be low-level voltages.

The disable first scan signal, the disable second scan signal, and the disable third scan signal may refer to a gate-off voltage at which transistors included in the pixels PX can be turned off. As an example, in a P-type transistor, the disable first scan signal, the disable second scan signal, and the disable third scan signal may be high-level voltages.

FIG. 2 shows the first scan driver 132, the second scan driver 134, and the third scan driver 136 connected to a first scan line SL1*i*, a second scan line SL2*i*, and a third scan line SL3*i*, respectively. However, embodiments of the present disclosure are not limited thereto. As an example, at least two scan lines among the first scan line SL1*i*, the second scan line SL2*i*, and the third scan line SL3*i* may be driven by one scan driver.

Figure 4:
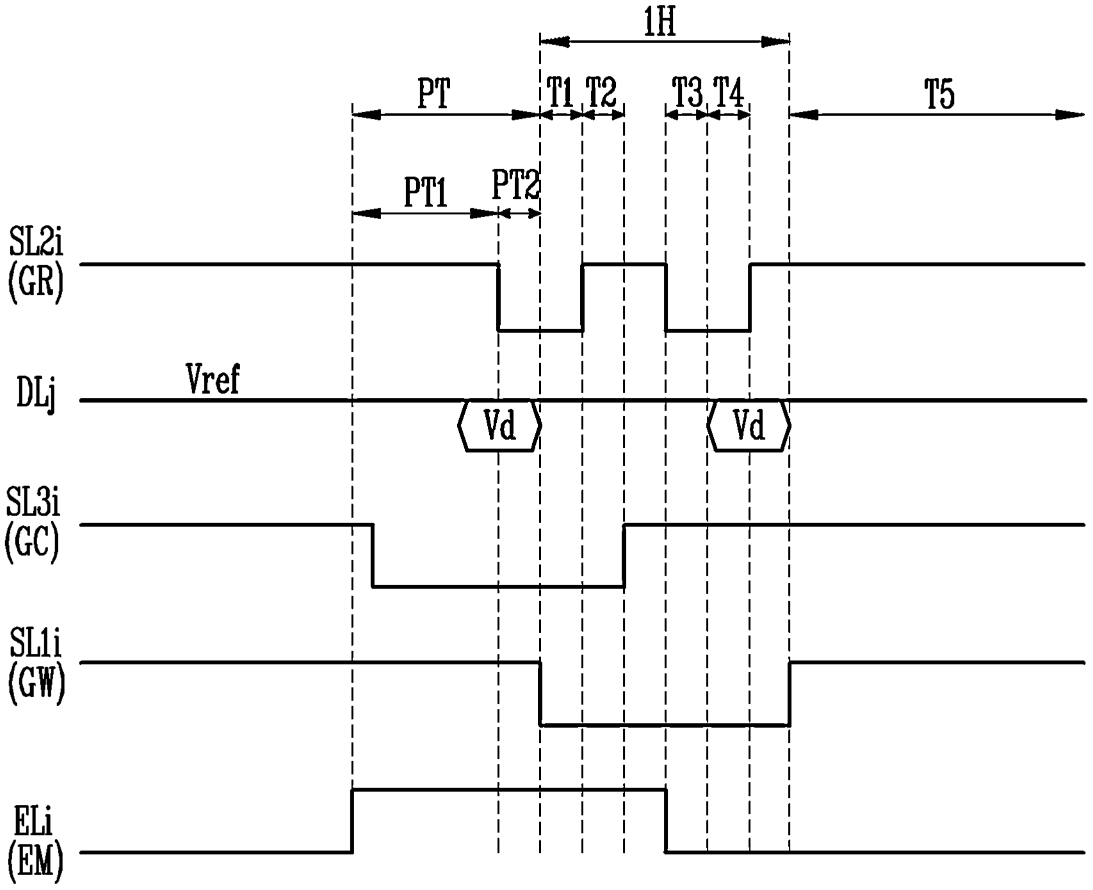
FIG. 4 is a waveform diagram illustrating an embodiment of a method for driving the pixel shown in FIG. 3.

The data driver 140 may receive output data Dout and a data driving signal DCS from the timing controller 120. The data driving signal DCS may include a sampling signal and/or timing signals necessary for driving the data driver 140. The data driver 140 may generate the data signal based on the data driving signal DCS and the output data Dout. As an example, the data driver 140 may generate an analog data signal based on a grayscale of the output data Dout. As shown in FIG. 4, the data driver 140 may sequentially supply a voltage of a reference power source Vref and a voltage Vd of the data signal to the data lines DL1 to DLm during one horizontal period 1H.

In an embodiment, the reference power source Vref may be set to a higher voltage (the same or higher voltage) than the voltage Vd of the data signal. In an embodiment, the voltage Vd of the data signal may be set to a voltage equal to or lower than that of a second driving power source VSS.

The emission driver 150 may receive an emission driving signal ECS from the timing controller 120. The emission driving signal ECS may include an emission start signal and clock signals necessary for driving the emission driver 150. The emission driver 150 may generate an emission control signal by shifting the emission start signal in response to a clock signal.

As an example, as shown in FIG. 2, the emission driver 150 may receive an emission start signal EFLM and generate a disable emission control signal by shifting the emission start signal EFLM in response to the clock signal. The emission driver 150 may sequentially supply the disable emission control signal to the emission control lines EL1 to ELn. The emission driver 150 may supply an enable emission control signal to the emission control lines EL1 to ELn when the disable emission control signal is not supplied.

The disable emission control signal may refer to a gate-off voltage at which transistors included in the pixels PX can be turned off. As an example, in a P-type transistor, the disable emission control signal may be a high-level voltage.

The enable emission control signal may refer to a gate-on voltage at which transistors included in the pixels PX can be turned on. As an example, in a P-type transistor, the enable emission control signal may be a low-level voltage.

The timing controller 120 may receive input data Din and a control signal CS from a host system through an interface. As an example, the timing controller 120 may receive the input data Din and the control signal CS from at least one of a graphics processing unit (GPU), a central processing unit (CPU), and an application processor (AP) included in the host system. The control signal CS may include various signals including a clock signal.

The timing controller 120 may generate the scan driving signal SCS, the data driving signal DCS, and the emission driving signal ECS based on the control signal CS. The scan driving signal SCS, the data driving signal DCS, and the emission driving signal ECS may be supplied to the scan driver 130, the data driver 140, and the emission driver 150, respectively.

The timing controller 120 may rearrange the input data Din to match the specifications of the display device 100. In addition, the timing controller 120 may correct the input data Din to generate the output data Dout and supply the output data Dout to the data driver 140. In an embodiment, the timing controller 120 may correct the input data Din in response to an optical measurement result measured during a process.

The power supply unit 160 may generate various power sources necessary for driving the display device 100. As an example, the power supply unit 160 may generate a first driving power source VDD and the second driving power source VSS.

The first driving power source VDD may be a power source that supplies driving current to the pixels PX. The second driving power source VSS may be a power source that receives driving current from the pixels PX. During a period in which the pixels PX are set to emit light, the first driving power source VDD may be set to a higher voltage than the second driving power source VSS.

The first driving power source VDD generated in the power supply unit 160 may be supplied to a first power source line PL1, and the second driving power source VSS generated in the power supply unit 160 may be supplied to a second power source line PL2. The first power source line PL1 and the second power source line PL2 may be commonly connected to the pixels PX, but embodiments of the present disclosure are not limited thereto.

In an embodiment, the first power source line PL1 may be composed of a plurality of power source lines, and the plurality of power source lines may be connected to different pixels PX. In an embodiment, the second power source line PL2 may be composed of a plurality of power source lines, and the plurality of power source lines may be connected to different pixels PX. That is, in the embodiment of the present disclosure, the pixels PX may be connected to any one of first power source lines PL1 and any one of second power source lines PL2.

Figure 3:
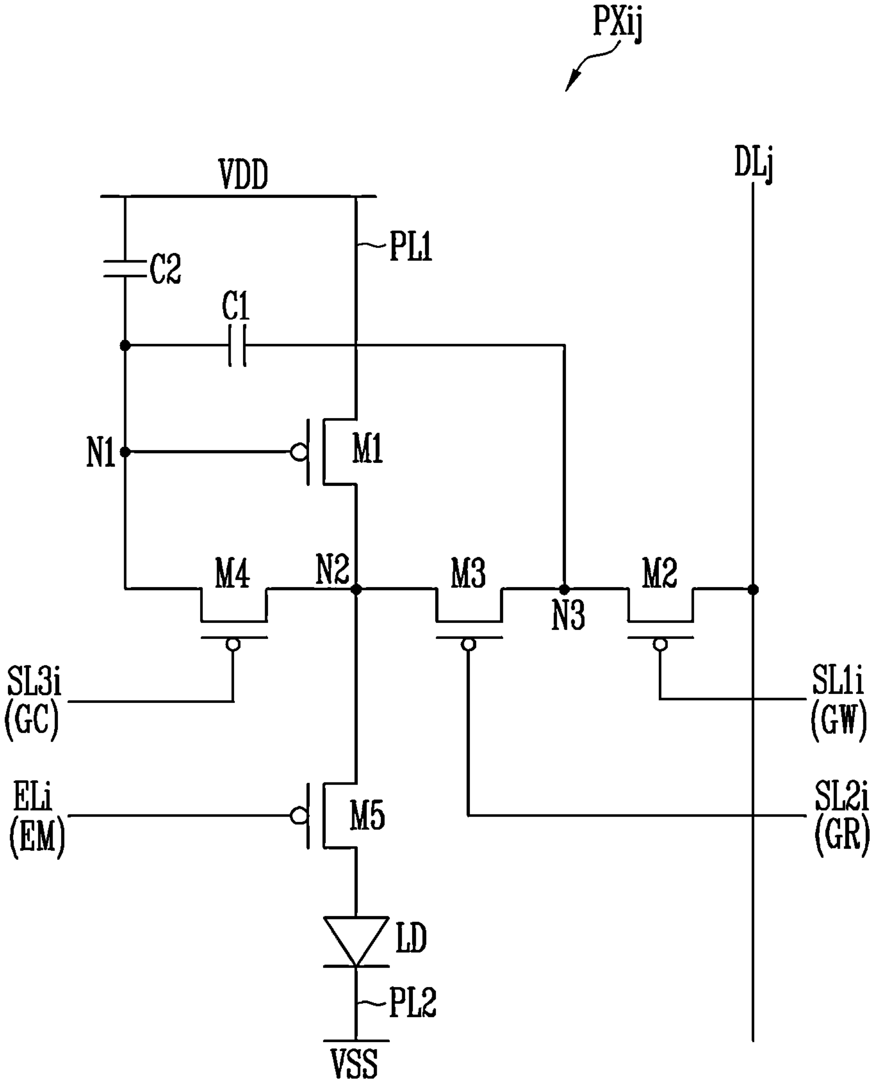
FIG. 3 is a diagram illustrating a pixel according to an embodiment of the present disclosure.

FIG. 3 is a diagram illustrating a pixel according to an embodiment of the present disclosure. FIG. 3 shows a pixel located on the i-th horizontal line and the j-th vertical line.

Referring to FIG. 3, the pixel PXij according to an embodiment of the present disclosure may be connected to corresponding signal lines SL1*i*, SL2*i*, SL3*i*, ELi, and DLj. For example, the pixel PXij may be connected to the i-th first scan line SL1*i*, the i-th second scan line SL2*i*, the i-th third scan line SL3*i*, the i-th emission control line ELi, and the j-th data line DLj. In an embodiment, the pixel PXij may be further connected to the first power source line PL1 and the second power source line PL2.

The pixel PXij according to an embodiment of the present disclosure may include a light emitting element LD and a pixel circuit for controlling the amount of current supplied to the light emitting element LD.

The light emitting element LD may be connected between the first power source line PL1 and the second power source line PL2.

For example, a first electrode (or anode electrode) of the light emitting element LD may be electrically connected to the first power source line PL1 via a fifth transistor M5, a second node N2, and a first transistor M1, and a second electrode (or cathode electrode) of the light emitting element LD may be electrically connected to the second power source line PL2. The light emitting element LD may generate light with a predetermined luminance in response to the amount of current supplied from the first power source line PL1 to the second power source line PL2 via the pixel circuit.

The light emitting element LD may be an organic light emitting diode. Also, the light emitting element LD may be an inorganic light emitting diode, such as a micro LED (light emitting diode) or a quantum dot light emitting diode. In addition, the light emitting element LD may be an element composed of a combination of organic and inorganic materials. In FIG. 3, the pixel PXij includes a single light emitting element LD. However, in another embodiment, the pixel PXij may include a plurality of light emitting elements LD, and the plurality of light emitting elements LD may be connected to each other in series, in parallel, or in series and parallel.

The pixel circuit may include the first transistor M1, a second transistor M2, a third transistor M3, a fourth transistor M4, the fifth transistor M5, a first capacitor C1, and a second capacitor C2.

In an embodiment, the first transistor M1 to the fifth transistor M5 may be composed of P-type transistors. However, this is only an example, and at least one of the first transistor M1 to the fifth transistor M5 may be replaced with an N-type transistor.

A first electrode of the first transistor M1 (or driving transistor) may be electrically connected to the first power source line PL1, and a second electrode of the first transistor M1 may be connected to the second node N2. Here, the expression "connected" refers to being electrically connected. A gate electrode of the first transistor M1 may be connected to a first node N1. The first transistor M1 may control the amount of current supplied from the first driving power source VDD to the second driving power source VSS via the light emitting element LD in response to a voltage of the first node N1.

The second transistor M2 may be connected between a data line DLj and a third node N3. Additionally, a gate electrode of the second transistor M2 may be electrically connected to a first scan line SL1*i*. The second transistor M2 may be turned on in response to an enable first scan signal GW being supplied to the first scan line SL1*i* to electrically connect the data line DLj and the third node N3.

The third transistor M3 may be connected between the second node N2 and the third node N3. Additionally, a gate electrode of the third transistor M3 may be electrically connected to a second scan line SL2*i*. The third transistor M3 may be turned on in response to an enable second scan signal GR being supplied to the second scan line SL2*i* to electrically connect the second node N2 and the third node N3.

The fourth transistor M4 may be connected between the first node N1 and the second node N2. Additionally, a gate electrode of the fourth transistor M4 may be electrically connected to a third scan line SL3*i*. The fourth transistor M4 may be turned on in response to an enable third scan signal GC being supplied to the third scan line SL3*i* to electrically connect the first node N1 and the second node N2. In this case, the gate electrode (that is, the first node N1) and the second electrode (that is, the second node N2) of the first transistor M1 may be electrically connected to each other, and thus the first transistor M1 may be connected in the form of a diode.

The fifth transistor M5 may be connected between the second node N2 and the first electrode of the light emitting element LD. Additionally, a gate electrode of the fifth transistor M5 may be electrically connected to an emission control line ELi. The fifth transistor M5 may be turned off in response to a disable emission control signal EM being supplied to the emission control line Eli, thereby blocking the electrical connection between the second node N2 and the light emitting element LD.

The first capacitor C1 may be connected between the first node N1 and the third node N3. The first capacitor C1 may change the voltage of the first node N1 in response to a change in a voltage of the third node N3. That is, the first capacitor C1 may be driven as a coupling capacitor.

The second capacitor C2 may be connected between the first power source line PL1 and the first node N1. The second capacitor C2 may store the voltage of the first node N1.

As described above, the pixel PXij according to the embodiment of the present disclosure may include five transistors M1 to M5 and two capacitors C1 and C2. In addition, the pixel PXij according to the embodiment of the present disclosure may be connected to two power source lines PL1 and PL2. Generally, conventional pixels are connected to three or more power source lines and six or more transistors. Accordingly, the pixel PXij according to the embodiment disclosure may be applied to a high-resolution display panel because power source lines and transistors occupy minimal space.

FIG. 4 is a waveform diagram illustrating an embodiment of a method for driving the pixel shown in FIG. 3.

Referring to FIG. 4, a horizontal period 1H (or a specific horizontal period) in which the data signal is supplied to the pixel PXij located on the i-th horizontal line and the j-th vertical line may include a first period T1, a second period T2, a third period T3, and a fourth period T4. In addition, at least a portion of a previous horizontal period in which the data signal is supplied to an (i−1)th horizontal line may be referred to as a previous period PT. The previous period PT may include a previous first period PT1 and a previous second period PT2 that immediately precede the horizontal period 1H.

The data driver 140 may supply the voltage of the reference power source Vref to the data line DLj during the first period T1 to the third period T3, and supply the voltage Vd of the data signal to the data line DLj during the fourth period T4. The reference power source Vref may be set to a higher voltage than the voltage Vd of the data signal. The reference power source Vref may be set to a lower voltage than the first driving power source VDD. The voltage Vd of the data signal may be set to a voltage equal to or lower than that of the second driving power source VSS.

The scan driver 130 (or the first scan driver 132) may supply the enable first scan signal GW to the first scan line SL1*i* during the first period T1 to the fourth period T4. The scan driver 130 (or the second scan driver 134) may supply the enable second scan signal GR to the second scan line SL2*i* during the previous second period PT2, the first period T1, the third period T3, and the fourth period T4. The scan driver 130 (or the third scan driver 136) may supply the enable third scan signal GC to the third scan line SL3*i* during the previous period PT, the first period T1, and the second period T2.

The emission driver 150 may supply the disable emission control signal EM to the emission control line ELi during the previous period PT, the first period T1, and the second period T2. Here, the disable emission control signal EM may be set to a wider width (or longer length, longer time, etc.) than the enable third scan signal GC to include the unlabeled period between the second period T2 and the third period T3 shown in FIG. 4.

The previous period PT may be a period in which the pixel PXij does not emit light. The first period T1 may be a period in which the first node N1 is initialized. The second period T2 may be a period in which a threshold voltage of the first transistor M1 is compensated. The third period T3 may be a period in which the first electrode of the light emitting element LD is initialized. The fourth period T4 may be a period in which the voltage Vd of the data signal is supplied to the pixel PXij. A fifth period T5 after the fourth period T4 may be a period in which the pixel PXij emits light in response to the voltage Vd of the data signal.

FIGS. 5A to 5G are diagrams illustrating an embodiment of an operation process of the pixel corresponding to driving waveforms of FIG. 4.

Figure 5A:
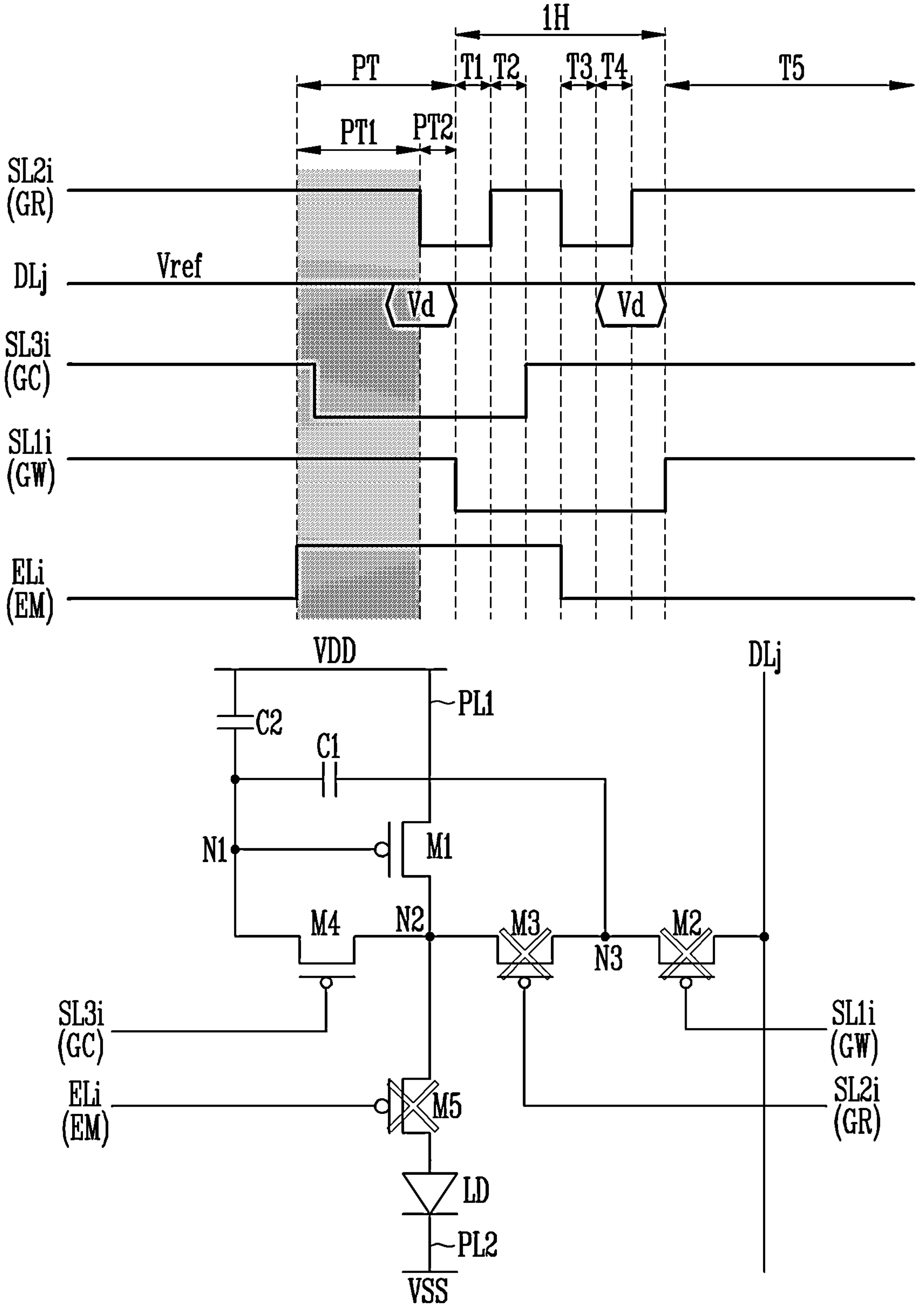
FIGS. 5A to 5G are diagrams illustrating an embodiment of an operation process of the pixel corresponding to driving waveforms of FIG. 4.

Referring to FIG. 5A, during the previous first period PT1, the enable third scan signal GC may be supplied to the third scan line SL3*i*, and the disable emission control signal EM may be supplied to the emission control line ELi.

In response to the enable third scan signal GC being supplied to the third scan line SL3*i*, the fourth transistor M4 may be turned on. In response to the disable emission control signal EM being supplied to the emission control line ELi, the fifth transistor M5 may be turned off. With the fifth transistor M5 is turned off, electrical connection between the second node N2 and the light emitting element LD may be blocked. During the previous first period PT1, the pixel PXij does not emit light.

Figure 5B:
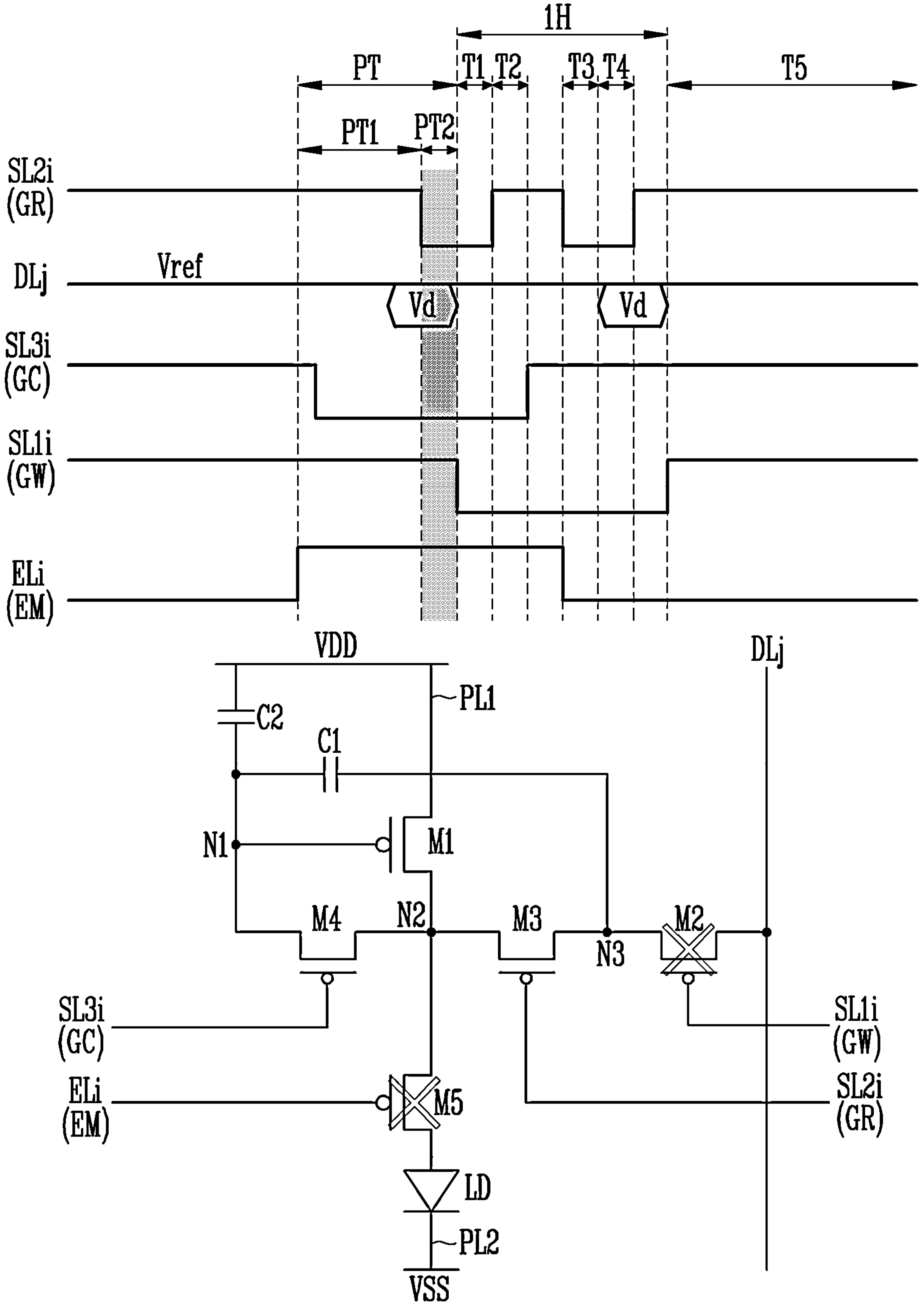

Referring to FIG. 5B, during the previous second period PT2, supply of the enable third scan signal GC and the disable emission control signal EM supplied during the previous first period PT1 may be maintained. In addition, during the previous second period PT2, the enable second scan signal GR may be supplied to the second scan line SL2*i*. In response to the enable second scan signal GR being supplied to the second scan line SL2*i*, the third transistor M3 may be turned on. In response to the third transistor M3 being turned on, the second node N2 and the third node N3 may be electrically connected to each other. During the previous second period PT2, the pixel PXij may remain in a state of not emitting light.

Figure 5C:
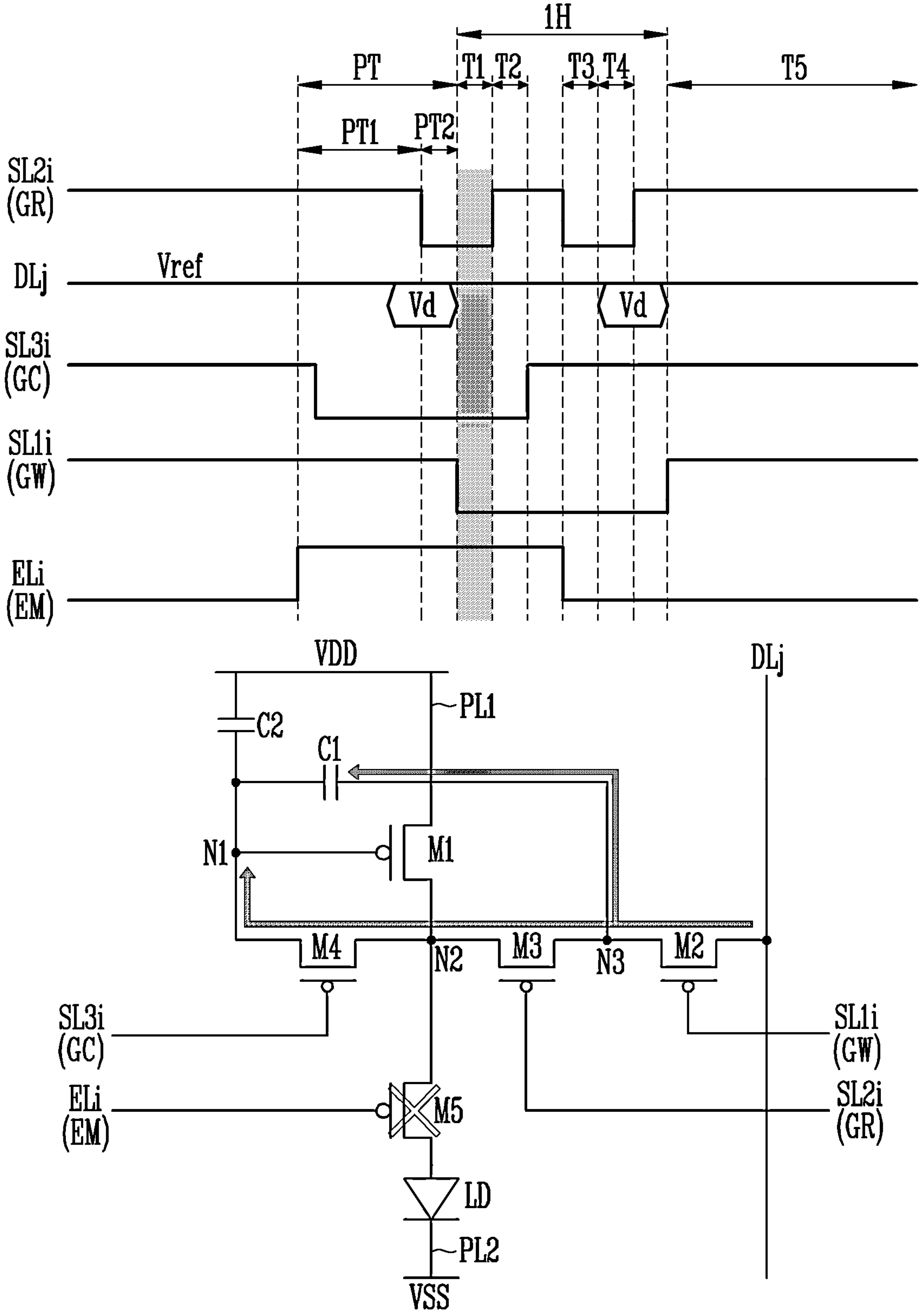

Referring to FIG. 5C, during the first period T1, supply of the enable second scan signal GR, the enable third scan signal GC, and the disable emission control signal EM supplied during the previous second period PT2 may be maintained.

During the first period T1, the enable first scan signal GW may be supplied to the first scan line SL1*i*. In response to the enable first scan signal GR being supplied to the first scan line SL1*i*, the second transistor M2 may be turned on. In response to the second transistor M2 being turned on, the voltage of the reference power source Vref from the data line DLj may be supplied to the first node N1 via the third node N3 and the second node N2.

During the first period T1, the first node N1, the second node N2, and the third node N3 may be initialized to the voltage of the reference power source Vref. During the first period T1, the first capacitor C1 may be initialized because the same voltage (that is, the voltage of the reference power source Vref) is applied to both ends of the first capacitor C1. Likewise, during the first period T1, the second capacitor C2 may be initialized by the voltage of the reference power source Vref supplied to the first node N1. During the first period T1, the pixel PXij may remain in a state of not emitting light.

Figure 5D:
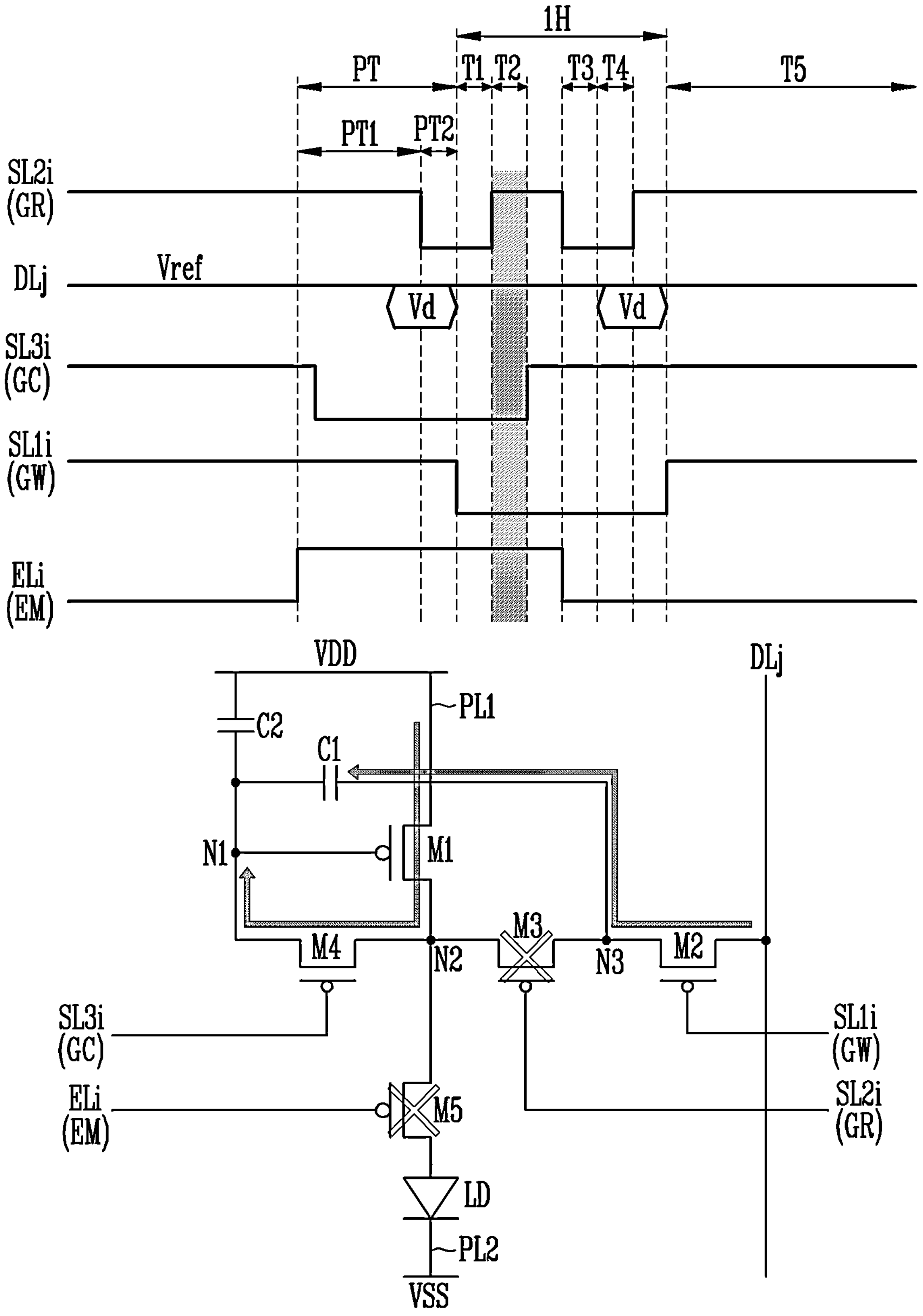

Referring to FIG. 5D, during the second period T2, supply of the enable first scan signal GW, the enable third scan signal GC, and the disable emission control signal EM supplied during the first period T1 may be maintained.

Unlike in the first period T1, during the second period T2, the disable second scan signal GR may be supplied to the second scan line SL2*i*. In response to the disable second scan signal GR being supplied to the second scan line SL2*i*, the third transistor M3 may be turned off. In response to the third transistor M3 being turned off, electrical connection between the second node N2 and the third node N3 may be blocked.

Since the first node N1 is initialized to the voltage of the reference power source Vref lower than the first driving power source VDD during the first period T1, during the second period T2, a voltage of the first driving power source VDD may be supplied to the first node N1 via the first transistor M1 connected in the form of a diode. In this case, a voltage obtained by subtracting an absolute value of the threshold voltage of the first transistor M1 from the first driving power source VDD may be applied to the first node N1.

Then, during the second period T2, a voltage corresponding to the threshold voltage of the first transistor M1 may be stored in each of the first capacitor C1 and the second capacitor C2. For example, a voltage corresponding to a difference between the voltage obtained by subtracting the absolute value of the threshold voltage of the first transistor M1 from the first driving power source VDD and the reference power source Vref may be stored in the first capacitor C1. For example, the threshold voltage of the first transistor M1 may be stored in the second capacitor C2. During the second period T2, the pixel PXij may remain in a state of not emitting light.

Figure 5E:
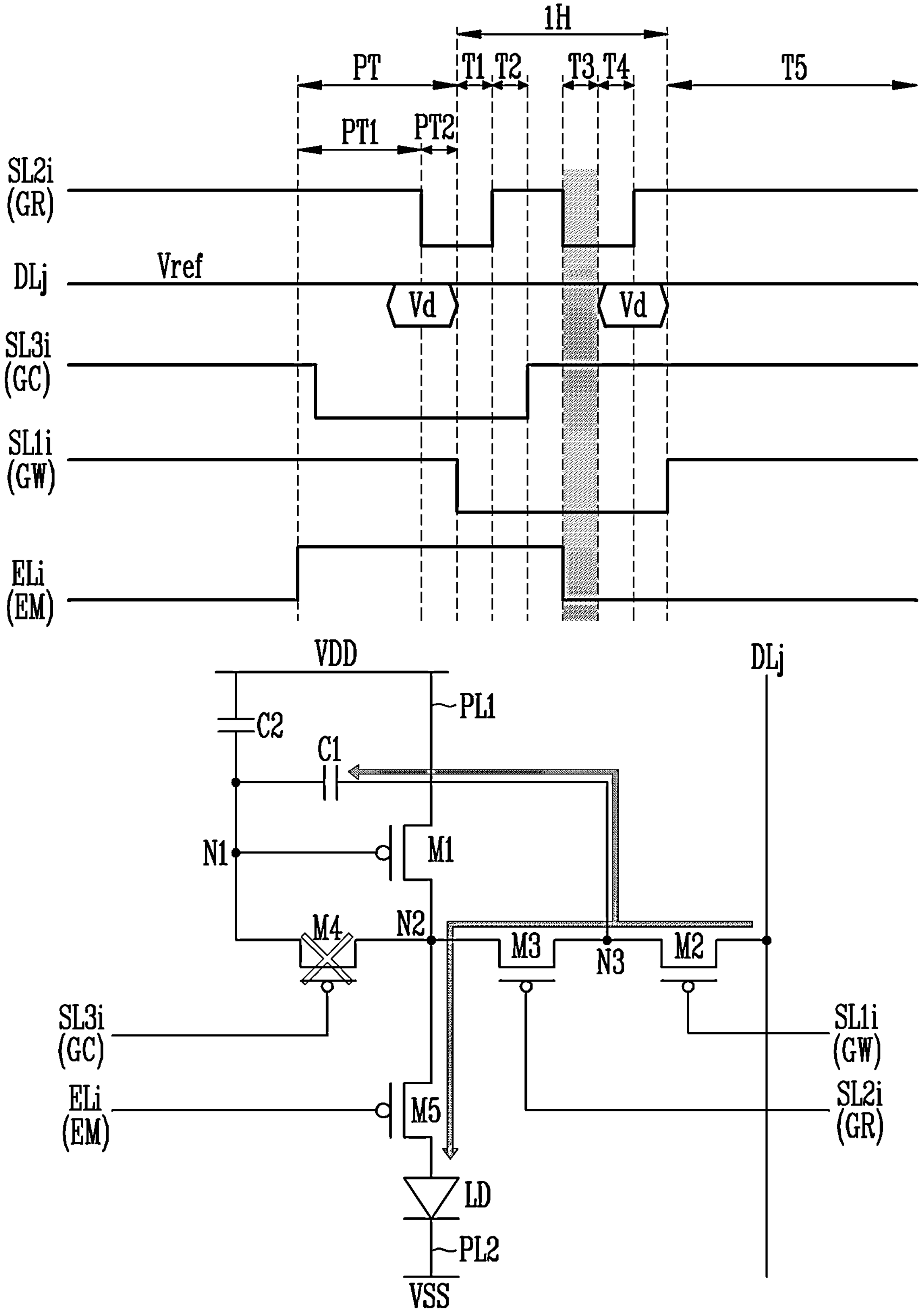

Referring to FIG. 5E, during the third period T3, supply of the enable first scan signal GW supplied during the second period T2 may be maintained.

During the third period T3, the enable second scan signal GR may be supplied to the second scan line SL2*i*, the disable third scan signal GC may be supplied to the third scan line SL3*i*, and the enable emission control signal EM may be supplied to the emission control line ELi.

In response to the disable third scan signal GC being supplied to the third scan line SL3*i*, the fourth transistor M4 may be turned off. As a result of the fourth transistor M4 being turned off, electrical connection between the first node N1 and the second node N2 may be blocked.

In response to the enable emission control signal EM being supplied to the emission control line ELi, the fifth transistor M5 may be turned on. With the fifth transistor M5 is turned on, the light emitting element LD and the second node N2 may be electrically connected to each other. In response to the enable second scan signal GR being supplied to the second scan line SL2*i*, the third transistor M3 may be turned on. With the second transistor M3 turned on, the second node N2 and the third node N3 may be electrically connected to each other.

Accordingly, the voltage of the reference power source Vref supplied from the data line DLj may be supplied to the first electrode of the light emitting element LD via the third node N3, the third transistor M3, the second node N2, and the fifth transistor M5. In response to the voltage of the reference power source Vref is supplied to the first electrode of the light emitting element LD, a parasitic capacitor of the light emitting element LD may be discharged. As the current voltage charged in the parasitic capacitor of the light emitting element LD is discharged (or removed), unintended low emission of light can be prevented. Accordingly, ability of the pixel PXij to express black can be improved.

Additionally, the reference power source Vref may be set to a voltage that maintains a state in which the light emitting element LD does not emit light. Accordingly, during the third period T3, the pixel PXij may remain in a state of not emitting light.

Figure 5F:
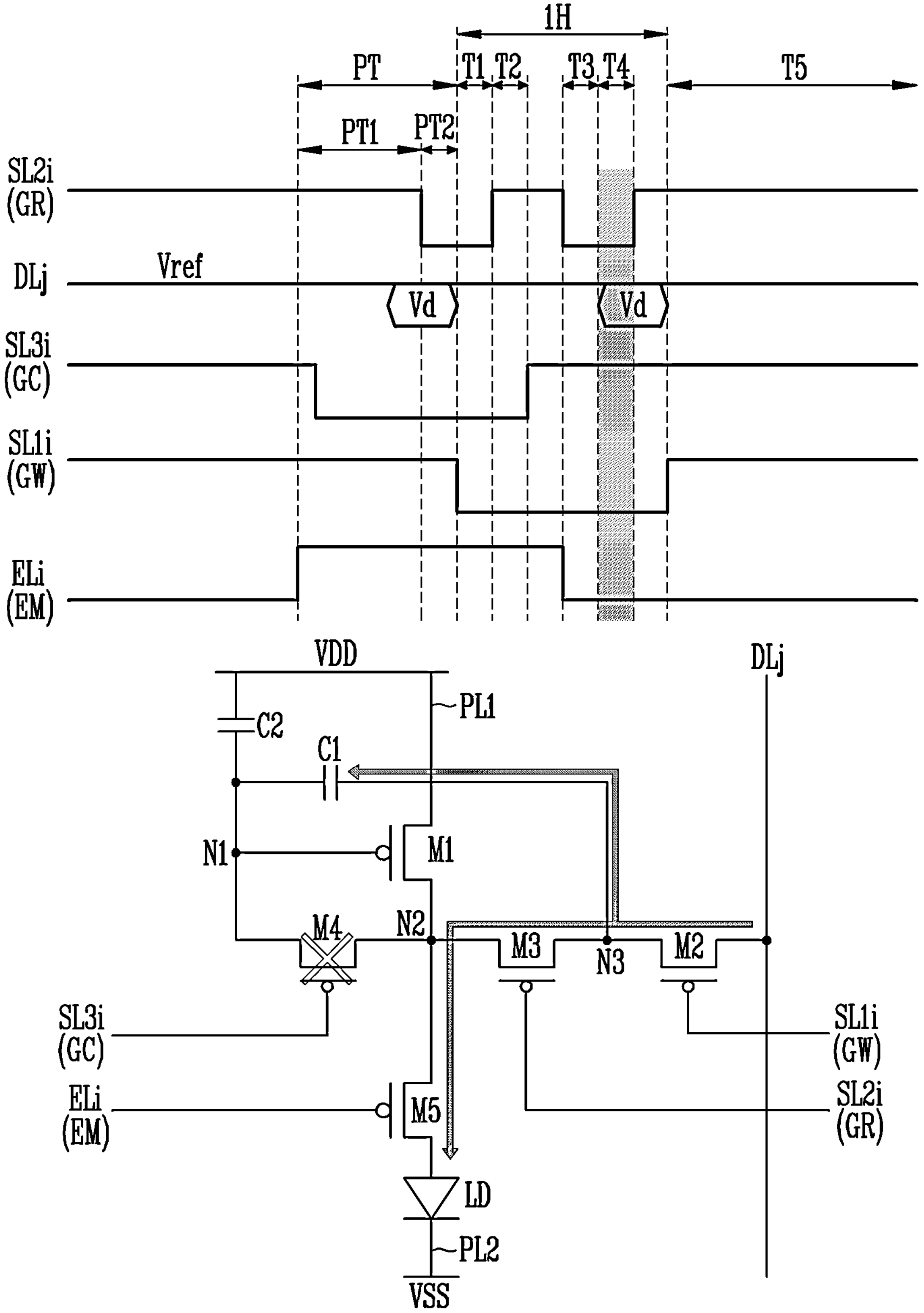

Referring to FIG. 5F, during the fourth period T4, supply of the enable first scan signal GW and the enable second scan signal GR supplied during the third period T3 may be maintained. Also, during the fourth period T4, the voltage Vd of the data signal may be supplied to the data line DLj.

The voltage Vd of the data signal supplied to the data line DLj may be supplied to the third node N3, the second node N2, and the first electrode of the light emitting element LD. In response to the voltage Vd of the data signal being supplied, a voltage of the third node N3 may be changed (or reduced) from the voltage of the reference power source Vref to the voltage Vd of the data signal. In this case, the voltage of the first node N1 may also be changed by coupling to the first capacitor C1.

Here, the amount of change in voltage at the first node N1 may be determined in accordance with a ratio of the first capacitor C1 and the second capacitor C2. For example, the voltage of the first node N1 may be changed by a value obtained by multiplying the amount of change in voltage at the third node N3 by C1/(C1+C2) from the voltage obtained by subtracting the absolute value of the threshold voltage of the first transistor M1 from the first driving power source VDD. When the amount of change in voltage at the first node N1 is controlled by the ratio of the first capacitor C1 and the second capacitor C2, the voltage range of the data signal can be set sufficiently wide.

For example, when the data signal is supplied directly to the gate electrode of the first transistor M1, the voltage range of the data signal can be set relatively narrow. When the data signal has a narrow voltage range, various grayscales (for example, 256 grayscales) are implemented using the narrow voltage range. Accordingly, it may be difficult to express accurate grayscale.

On the other hand, when the voltage supplied to the gate electrode of the first transistor M1 is controlled by the ratio of the first capacitor C1 and the second capacitor C2 as in the embodiment of the present disclosure, the voltage range of the data signal can be set sufficiently wide. For example, a voltage corresponding to the voltage obtained by multiplying the voltage of the data signal by C1/(C1+C2) may be transmitted to the gate electrode of the first transistor M1, and thus the voltage range of the data signal can be set wide. When the data signal has a wide voltage range, grayscale can be easily implemented.

During the fourth period T4, the first capacitor C1 and the second capacitor C2 may store the voltage of the first node N1. Here, the voltage of the first node N1 may be determined by the threshold voltage of the first transistor M1 and the voltage Vd of the data signal. Accordingly, during the fourth period T4, a voltage corresponding to the voltage Vd of the data signal and the threshold voltage of the first transistor M1 may be stored in the first capacitor C1 and the second capacitor C2.

Additionally, during the fourth period T4, the voltage Vd of the data signal may be supplied to the first electrode of the light emitting element LD. Here, the voltage Vd of the data signal may be set to a lower voltage than the second driving power source VSS, and the light emitting element LD may be turned off accordingly. Accordingly, during the fourth period T4, the voltage Vd of the data signal can be stably supplied to the third node N3.

Figure 5G:
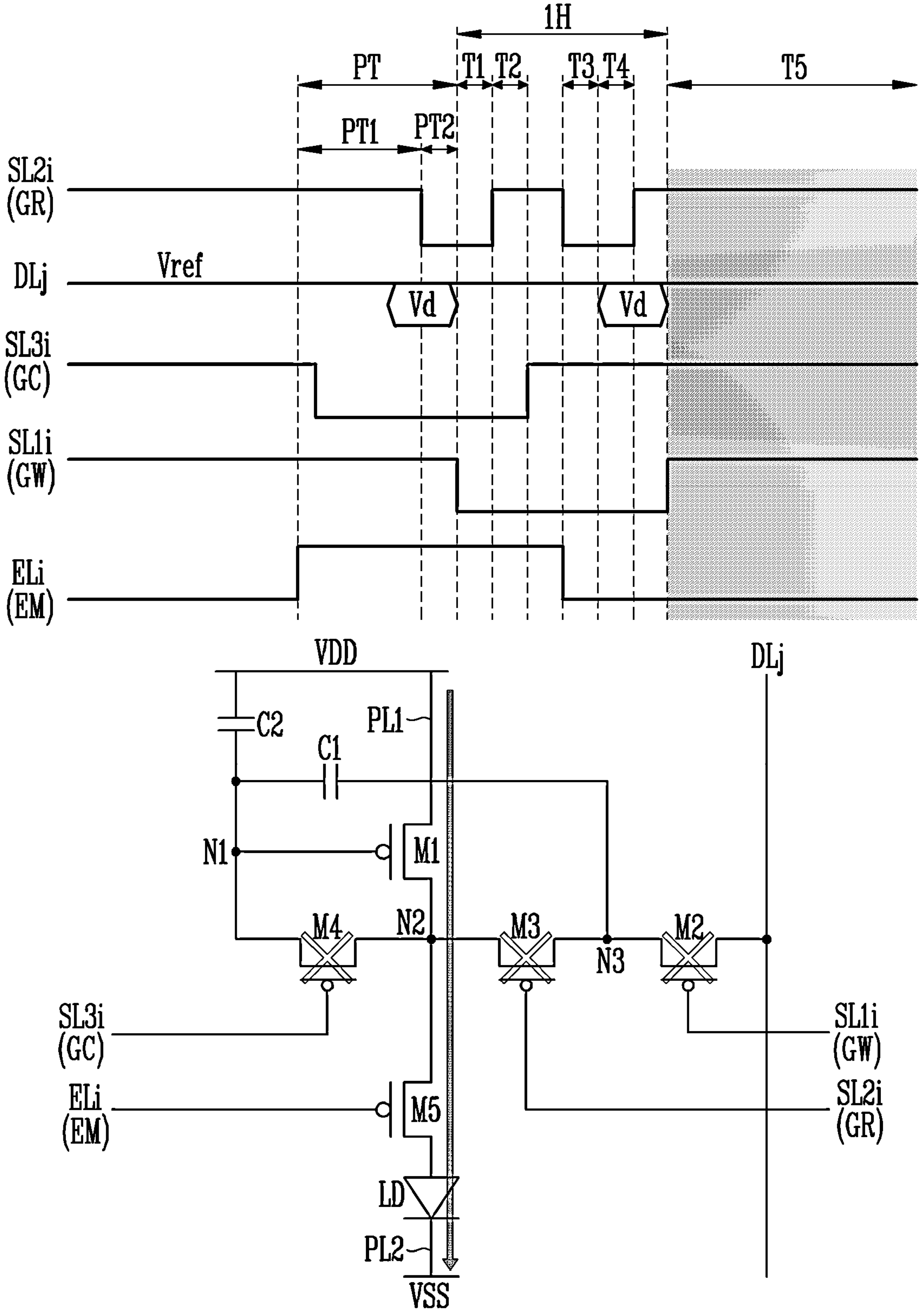

Referring to FIG. 5G, during the fifth period T5, the disable scan signals GW, GR, and GC may be supplied to the scan lines SL1*i*, SL2*i*, and SL3*i*, respectively. Then, during the fifth period T5, the second transistor M2, third transistor M3, and fourth transistor M4 may be turned off.

During the fifth period T5, the enable emission control signal EM may be supplied to the emission control line ELi. In response to the enable emission control signal EM being supplied to the emission control line ELi, the fifth transistor M5 may be turned on. With the fifth transistor M5 is turned on, the light emitting element LD may be electrically connected to the first transistor M1. Then, the current supplied from the first transistor M1 may be supplied to the light emitting element LD in response to the voltage of the first node N1, and the light emitting element LD may emit light with a luminance corresponding to the amount of current supplied from the first transistor M1.

Figure 6:
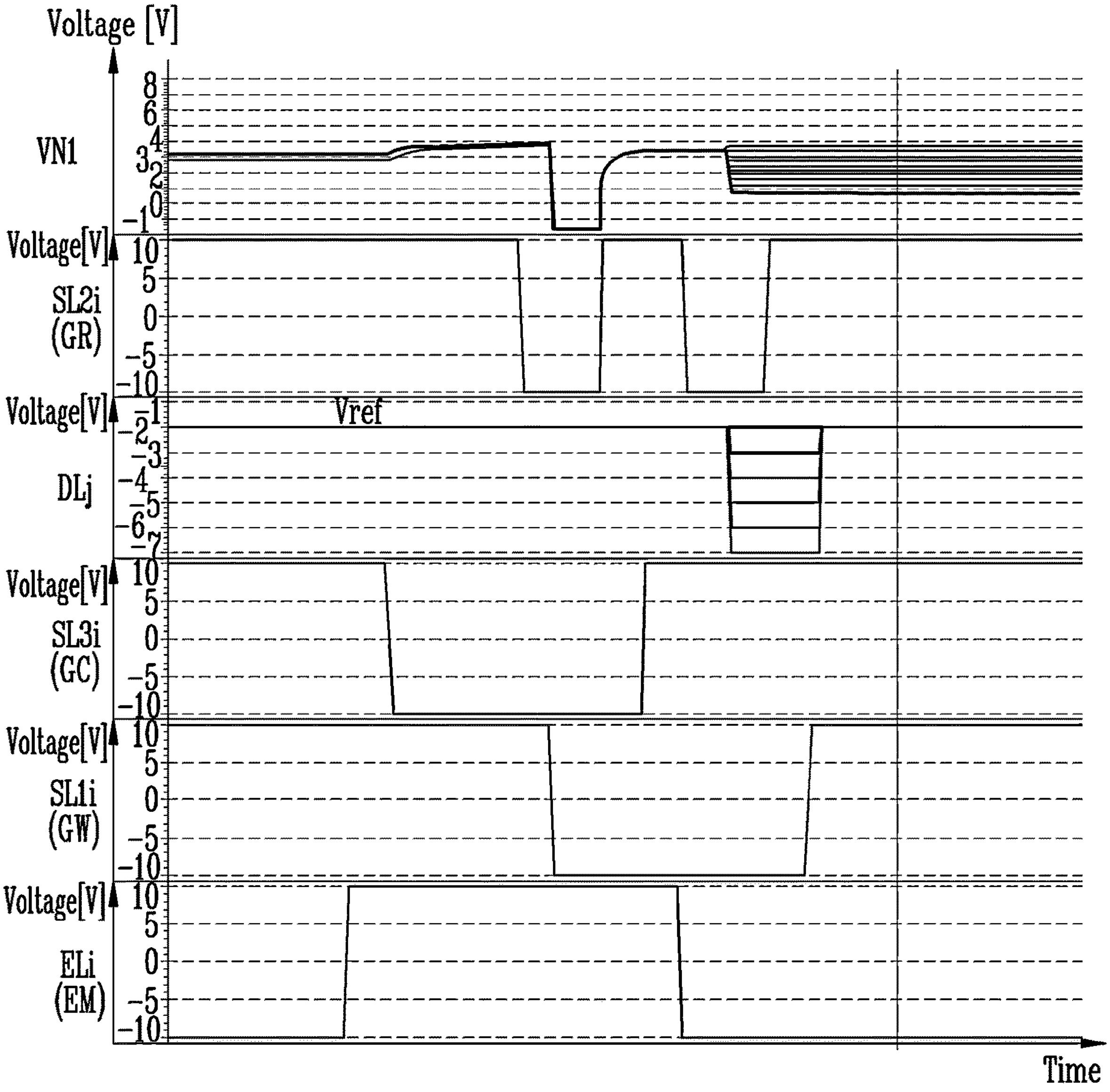
FIG. 6 is a diagram illustrating a simulation result of the pixel shown in FIG. 3.

FIG. 6 is a diagram illustrating a simulation result of the pixel shown in FIG. 3. In FIG. 6, the X-axis may mean time, and the Y-axis may mean voltage [V].

Referring to FIG. 6, if the voltage Vd of the supplied data signal is −2V, −3V, −4V, −5V, −6V, and −7V, a voltage VN1 of the first node N1 may be changed in response to the voltage Vd of the data signal. That is, in an embodiment of the present disclosure, the voltage VN1 of the first node N1 may be changed in response to a change in the voltage Vd of the data signal, and accordingly, light with a luminance corresponding to voltage Vd of the data signal may be generated in the pixel PXij.

Table 1 below shows a calculated voltage of the first node N1 (Calculated VG) and a simulated voltage of the first node N1 (Sim VG; VN1).

TABLE 1

| Vd | Calculated VG | Sim VG (VN1) |
|---|---|---|
| −2 V | 3.3 | 3.81 |
| −3 V | 2.8 | 3.31 |
| −4 V | 2.3 | 2.81 |
| −5 V | 1.8 | 1.81 |
| −6 V | 1.3 | 1.31 |
| −7 V | 0.8 | 0.82 |

In Table 1, it is assumed that a threshold voltage Vth of the first transistor M1 is −1.7V, a gate-on voltage supplied to the scan lines SL1, SL2, and SL3 and the emission control line EL is −10V, and a gate-off voltage is 10V. Also, it is assumed that the first capacitor C1 and the second capacitor C2 have the same capacitance. In addition, it is assumed that the resistance of the first transistor M1 is 8 times higher than the resistance of each of the second transistor M2, the third transistor M3, and the fourth transistor M4. Referring to Table 1, the voltage of the first node N1 calculated in response to the voltage Vd of the data signal (that is, Calculated VG) may have a voltage difference of approximately 0.01V from the voltage VN1 of the first node N1 obtained through simulation (that is, Sim VG). That is, the pixels PX according to the embodiment of the present disclosure can be driven for the purposes for which they were designed.

Figure 7:
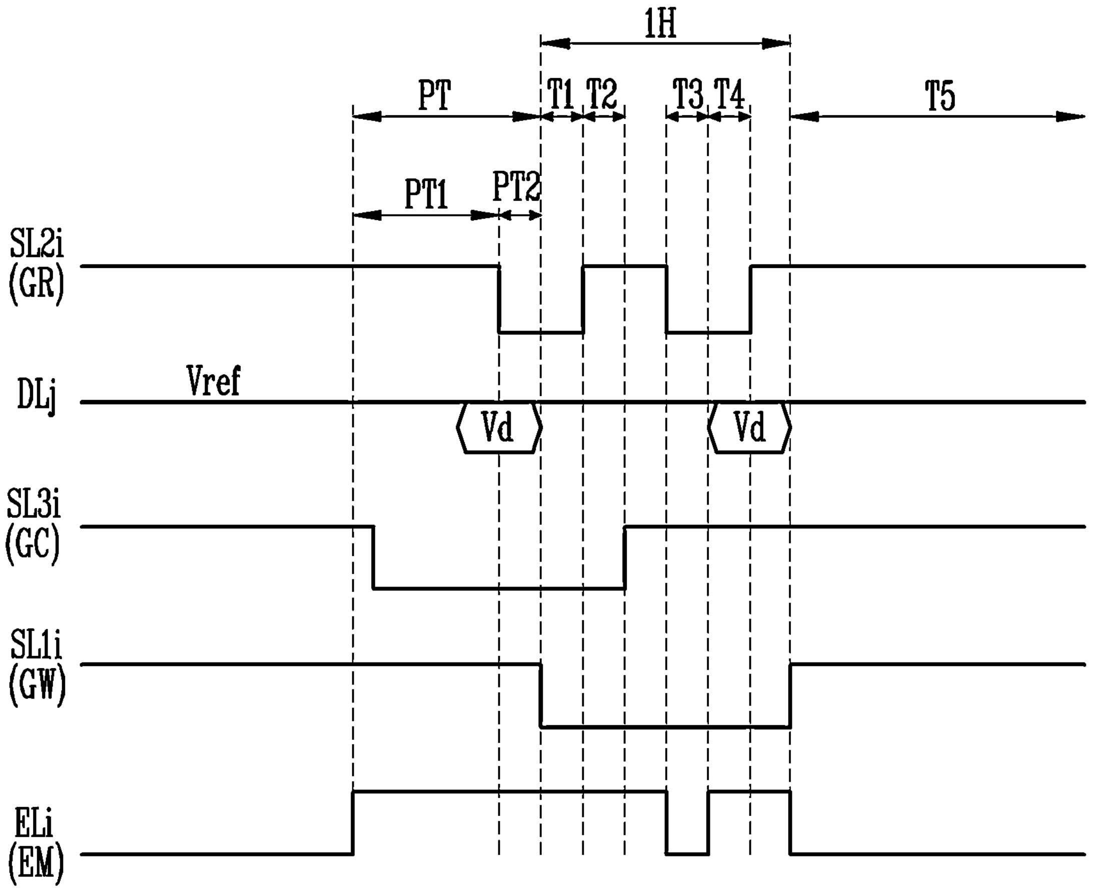
FIG. 7 is a waveform diagram illustrating an embodiment of a method for driving the pixel shown in FIG. 3.

FIG. 7 is a waveform diagram illustrating an embodiment of a method for driving the pixel shown in FIG. 3. In describing FIG. 7, descriptions of parts overlapping with FIGS. 4 to 5G will be omitted.

Referring to FIG. 7, during the fourth period T4, the disable emission control signal EM may be supplied to the emission control line ELi. In response to the disable emission control signal EM being supplied to the emission control line ELi, the fifth transistor M5 may be turned off during the fourth period T4. Then, during the fourth period T4, the voltage Vd of the data signal from the data line DLj may not be supplied to the light emitting element LD.

Figure 8:
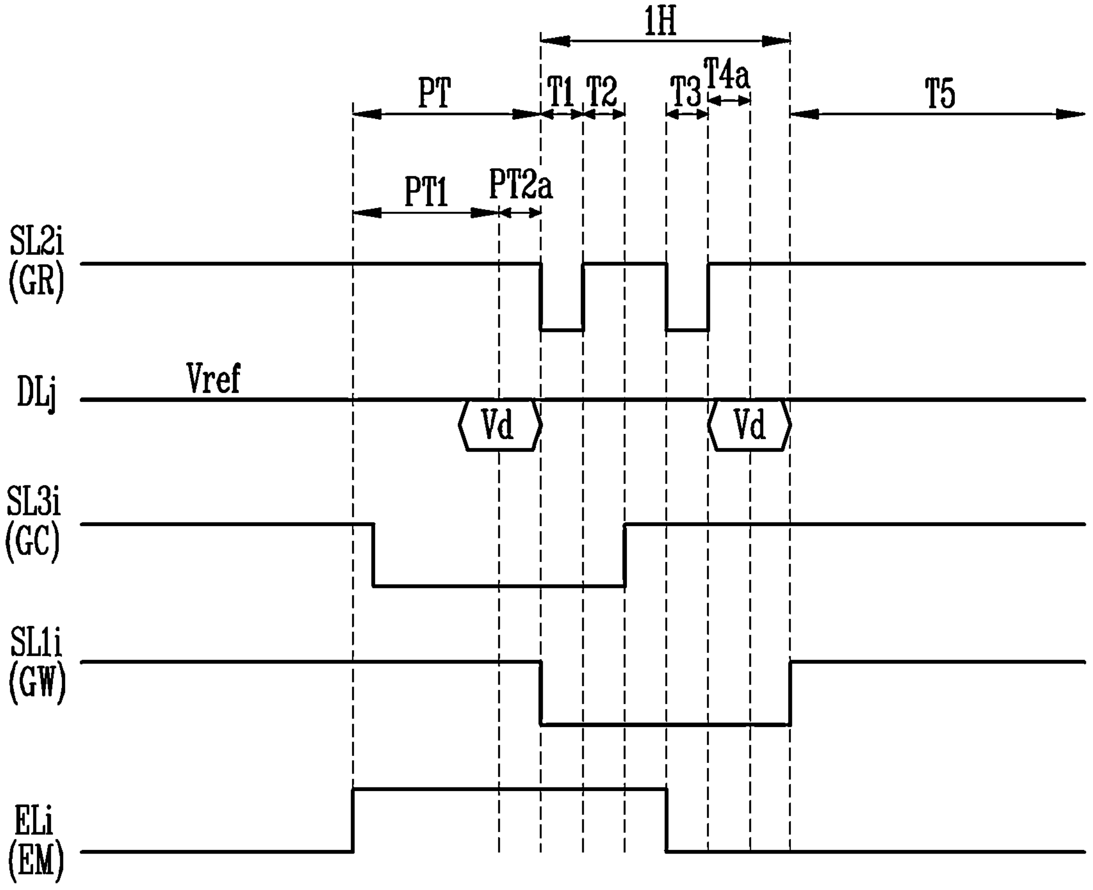
FIG. 8 is a waveform diagram illustrating an embodiment of a method of driving the pixel shown in FIG. 3.

FIG. 8 is a waveform diagram illustrating an embodiment of a method of driving the pixel shown in FIG. 3. In describing FIG. 8, descriptions of parts overlapping with FIGS. 4 to 5G will be omitted.

Referring to FIG. 8, the enable second scan signal GR supplied to the second scan line SL2*i* may be supplied during the first period T1 and the third period T3. The driving waveform of FIG. 8 may be different from the driving waveform of FIG. 4 in that the third transistor M3 is set to a turned-off state during a previous second period PT2*a* and a fourth period T4*a*.

When the third transistor M3 is turned off during the previous second period PT2*a*, the second node N2 and the third node N3 may be electrically blocked. The previous second period PT2*a* may be a period in which the pixel PXij does not emit light, and even if the third transistor M3 is turned off, the driving of the pixel PXij may not be affected.

When the third transistor M3 is turned off during the fourth period T4*a*, the second node N2 and the third node N3 may be electrically blocked. The fourth period T4*a* may be a period in which the voltage Vd of the data signal is transmitted to the first node N1. Even if the third transistor M3 is turned off during the fourth period T4*a*, the voltage of the first node N1 may be changed by the voltage Vd of the data signal supplied to the third node N3. Accordingly, the voltage Vd of the data signal may be transmitted to the first node N1.

In addition, with the third transistor M3 is turned off, the voltage Vd of the data signal may not be supplied to the first electrode of the light emitting element LD. Accordingly, the light emitting element LD may maintain the voltage of the reference power source Vref supplied during the third period T3.

Figure 9:
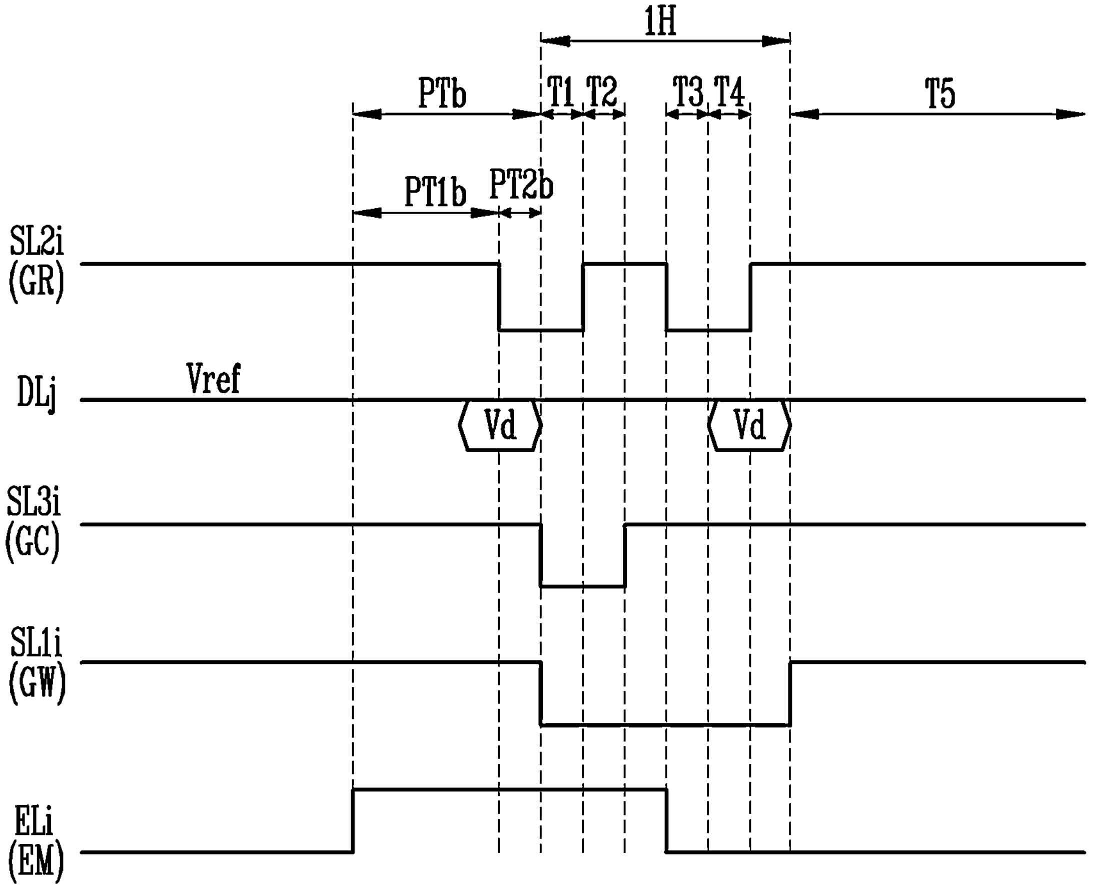
FIG. 9 is a waveform diagram illustrating an embodiment of a method for driving the pixel shown in FIG. 3.

FIG. 9 is a waveform diagram illustrating an embodiment of a method for driving the pixel shown in FIG. 3. In describing FIG. 9, descriptions of parts overlapping with FIGS. 4 to 5G will be omitted.

Referring to FIG. 9, the enable third scan signal GC supplied to the third scan line SL3*i* may be supplied during the first period T1 and the second period T2. Unlike in the driving waveform of FIG. 4, the disable third scan signal GC may be supplied to the third scan line SL3*i* during a previous period PTb (that is, PT1*b* and PT2*b*).

IN response to the disable third scan signal GC being supplied to the third scan line SL3*i*, the fourth transistor M4 may be turned off during the previous period PTb. The previous period PTb may be a period in which the pixel PXij does not emit light, and even if the fourth transistor M4 is turned off, the driving of the pixel PXij may not be affected.

Figure 10:
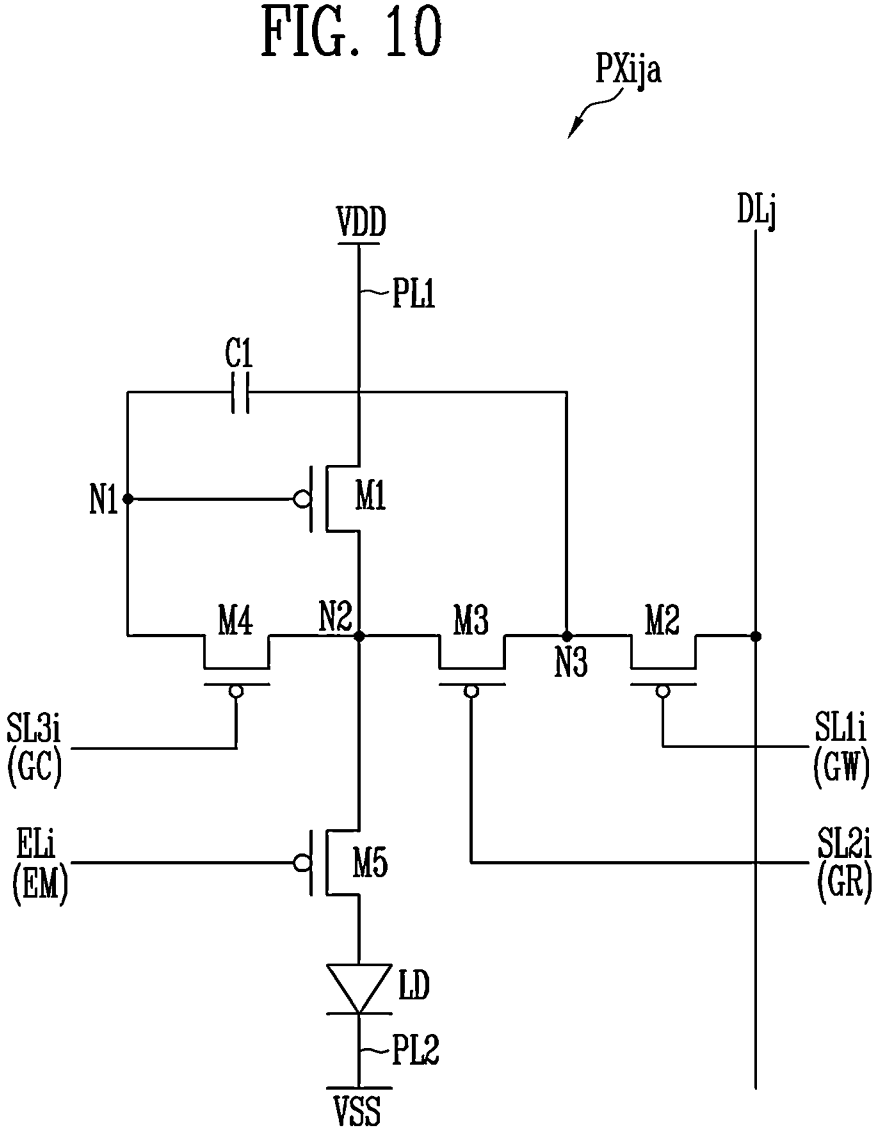
FIG. 10 is a diagram illustrating a pixel according to an embodiment of the present disclosure.

FIG. 10 is a diagram illustrating a pixel according to an embodiment of the present disclosure. FIG. 10 shows a pixel located on the i-th horizontal line and the j-th vertical line. In describing FIG. 10, descriptions of parts overlapping with FIG. 3 will be omitted.

Referring to FIG. 10, a pixel PXija according to an embodiment of the present disclosure may be connected to corresponding signal lines SL1*i*, SL2*i*, SL3*i*, ELi, and DLj.

The pixel PXija according to an embodiment of the present disclosure may include a light emitting element LD and a pixel circuit for controlling the amount of current supplied to the light emitting element LD.

The light emitting element LD may be connected between the first power source line PL1 and the second power source line PL2. The light emitting element LD may generate light with a predetermined luminance in response to the amount of current supplied from the first power source line PL1 to the second power source line PL2 via the pixel circuit.

The pixel circuit may include a first transistor M1, a second transistor M2, a third transistor M3, a fourth transistor M4, a fifth transistor M5, and a first capacitor C1.

Comparing the pixel PXija shown in FIG. 10 with the pixel PXij shown in FIG. 3, the second capacitor C2 may be omitted in the pixel PXija shown in FIG. 10. In this case, the amount of change in voltage at the third node N3 may not be transmitted to the first node N1 by the ratio of the first capacitor C1 and the second capacitor C2, but may be transmitted directly by the first capacitor C1. Other driving processes may be the same as those in FIG. 3, and detailed description in this regard will be omitted.

FIGS. 11 to 14 are diagrams illustrating electronic devices according to various embodiments.

Figure 11:
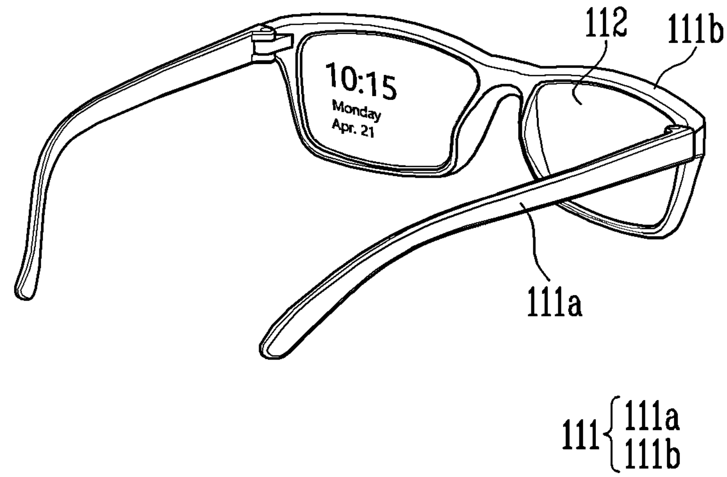
FIGS. 11 to 14 are diagrams illustrating electronic devices according to various embodiments.

Referring to FIG. 11, the display device 100 according to the above-described embodiments may be applied to smart glasses. The smart glasses may include a frame 111 and a lens unit 112. The smart glasses may be a wearable electronic device that can be worn on a user's face, and may have a structure in which a portion of the frame 111 is folded or unfolded. For example, the smart glasses may be a wearable device for augmented reality (AR).

The frame 111 may include a housing 111*b* supporting the lens unit 112 and leg parts 111*a* for a user to wear. The leg parts 111*a* may be connected to the housing 111*b* by hinges and may be folded or unfolded.

A battery, a touch pad, a microphone, a camera, etc. may be built into the frame 111. Also, a projector that outputs light, a processor that controls an optical signal, etc. may be built into the frame 111.

The lens unit 112 may be an optical member that transmits or reflects light. The lens unit 112 may include glass, transparent synthetic resin, etc.

The display device 100 according to the above-described embodiments may be applied to the lens unit 112. For example, a user may visually recognize an image displayed by an optical signal transmitted from the projector of the frame 111 through the lens unit 112. For example, the user may visually recognize information such as time and date displayed on the lens unit 112.

Figure 12:
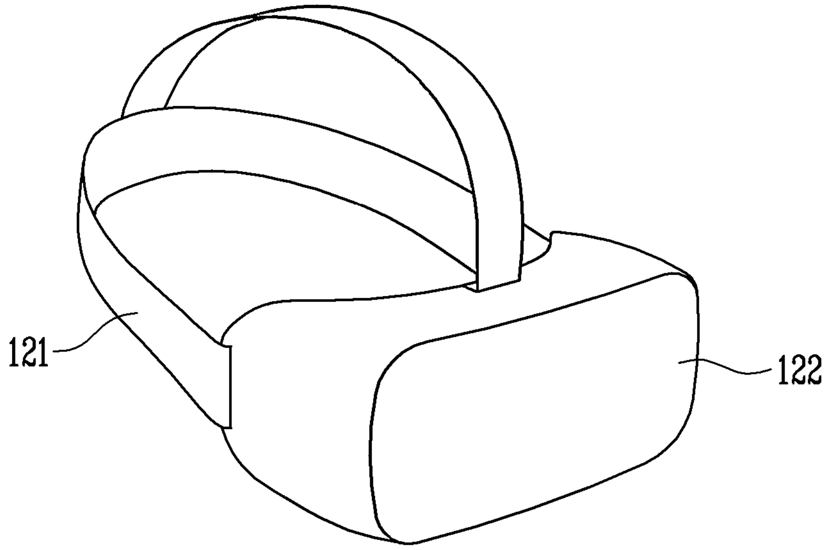

Referring to FIG. 12, the display device 100 according to the above-described embodiments may be applied to a head-mounted display (HMD). The head-mounted display may include a head-mounting band 121 and a display storage case 122. For example, the head-mounted display may be a wearable electronic device that can be worn on a user's head.

The head-mounting band 121 may be connected to the display storage case 122 and secure the display storage case 122. The head-mounting band 121 may include a horizontal band and a vertical band to secure the head-mounted display to the user's head. The horizontal band may be provided to surround the side of the user's head, and the vertical band may be provided to surround the top of the user's head. However, the present disclosure is not necessarily limited thereto, and the head-mounting band 121 may be implemented in the form of a glasses frame or a helmet.

The display storage case 122 may accommodate the display device 100 and may include at least one lens. At least one lens may provide an image to the user. For example, the display device 100 according to the above-described embodiments may be applied to the left-eye lens and the right-eye lens implemented within the display storage case 122.

Figure 13:
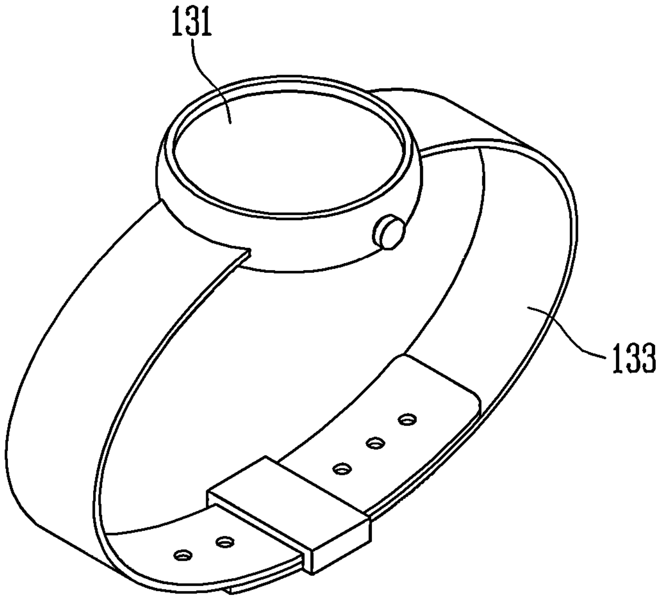

Referring to FIG. 13, the display device 100 according to the above-described embodiments may be applied to a smart watch. The smart watch may include a display unit 131 and a strap unit 133. The smart watch may be a wearable electronic device, and the strap unit 133 may be mounted on a user's wrist. The display device 100 according to the above-described embodiments may be applied to the display unit 131. For example, the display unit 131 may provide image data including information such as time and date.

Figure 14:
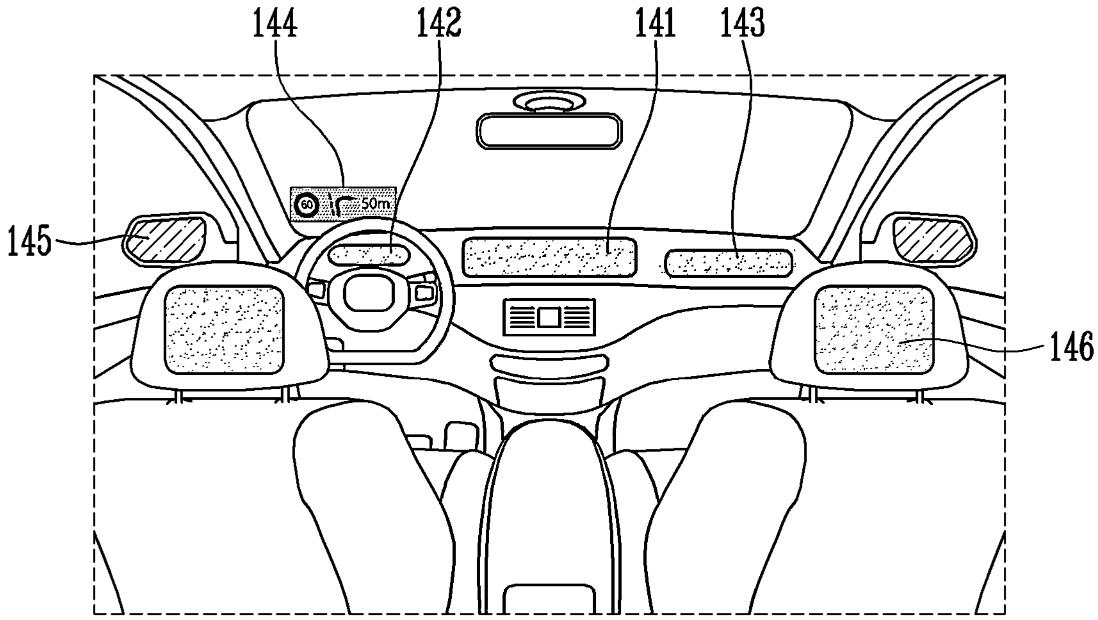

Referring to FIG. 14, the display device 100 according to the above-described embodiments may be applied to an automotive display. As an example, the automotive display may refer to an electronic device provided inside and outside a vehicle to provide image data.

For example, the display device 100 according to the above-described embodiments may be applied to at least one of an infotainment panel 141, a cluster 142, a co-driver display 143, a head-up display 144, a side mirror display 145, and a rear seat display 146 provided in a vehicle.

The pixel according to the embodiments of the present disclosure may be applied to a high-resolution display panel because it can compensate for a threshold voltage of the driving transistor using five transistors and two (or one) capacitors.

In the pixel according to the embodiments of the present disclosure, a data signal may be transmitted using capacitor coupling, so the voltage range of the data signal can be set wide.

However, effects of the present disclosure are not limited to the above-described effects, and may be variously extended without departing from the spirit and scope of the present disclosure.

As described above, preferred embodiments of the present disclosure have been described with reference to the drawings. However, those skilled in the art will appreciate that various modifications and changes can be made to the present disclosure without departing from the spirit and scope of the disclosure as set forth in the appended claims.

What is claimed is:

1. A pixel comprising:

a first transistor having a gate electrode connected to a first node, a first electrode connected to a first power source line, and a second electrode connected to a second node;

a second transistor connected between a data line and a third node and having a gate electrode electrically connected to a first scan line;

a third transistor connected between the second node and the third node and having a gate electrode electrically connected to a second scan line;

a first capacitor connected between the first node and the third node, wherein a terminal of the first capacitor is directly connected to the first node; and a light emitting element connected between the second node and a second power source line.

2. The pixel of claim 1, further comprising:

a fourth transistor connected between the first node and the second node and having a gate electrode electrically connected to a third scan line; and a fifth transistor connected between the second node and the light emitting element and having a gate electrode electrically connected to an emission control line.

3. The pixel of claim 1, further comprising:

a second capacitor connected between the first power source line and the first node.

4. The pixel of claim 3, further comprising:

a fourth transistor connected between the first node and the second node and having a gate electrode electrically connected to a third scan line; and a fifth transistor connected between the second node and the light emitting element and having a gate electrode electrically connected to an emission control line.

5. The pixel of claim 4, wherein a horizontal period in which a data signal is supplied to the pixel includes a first period, a second period, a third period, and a fourth period, wherein a voltage of a reference power source is supplied to the data line during the first period, the second period, and the third period, and a voltage of the data signal is supplied to the data line during the fourth period, wherein the second transistor is turned on during the first period to the fourth period, and wherein the fifth transistor is turned off during the first period and the second period.

6. The pixel of claim 5, wherein the fifth transistor is turned off during a portion of a previous period immediately preceding the horizontal period.

7. The pixel of claim 5, wherein the fifth transistor is turned off during the fourth period.

8. The pixel of claim 5, wherein the third transistor is turned on during the first period, the third period, and the fourth period, and wherein the fourth transistor is turned on during the first period and the second period.

9. The pixel of claim 8, wherein the fourth transistor is turned on during a portion of a previous period immediately preceding the horizontal period.

10. The pixel of claim 5, wherein the third transistor is turned on during the first period and the third period, and wherein the fourth transistor is turned on during the first period and the second period.

11. A display device comprising:

pixels connected to scan lines, data lines, and emission control lines;

a scan driver driving the scan lines;

a data driver driving the data lines; and an emission driver driving the emission control lines, wherein among the pixels, a pixel located on an i-th horizontal line (i is a natural number) and a j-th vertical line (j is a natural number) includes:

a first transistor having a gate electrode connected to a first node, a first electrode connected to a first power source line, and a second electrode connected to a second node;

a second transistor connected between a j-th data line and a third node and turned on in response to an enable first scan signal being supplied to an i-th first scan line;

a third transistor connected between the second node and the third node and turned on in response to an enable second scan signal being supplied to an i-th second scan line;

a first capacitor connected between the first node and the third node, wherein a terminal of the first capacitor is directly connected to the first node; and a light emitting element connected between the second node and a second power source line.

12. The display device of claim 11, wherein a first driving power source is supplied to the first power source line, and a second driving power source lower than the first driving power source is supplied to the second power source line.

13. The display device of claim 12, wherein the pixel further includes:

a fourth transistor connected between the first node and the second node and turned on in response to an enable third scan signal being supplied to an i-th third scan line; and a fifth transistor connected between the second node and the light emitting element and turned off in response to a disable emission control signal being supplied to an i-th emission control line.

14. The display device of claim 12, wherein the pixel further includes:

a second capacitor connected between the first power source line and the first node;

a fourth transistor connected between the first node and the second node and turned on in response to an enable third scan signal is supplied to an i-th third scan line; and a fifth transistor connected between the second node and the light emitting element and turned off in response to a disable emission control signal is supplied to an i-th emission control line.

15. The display device of claim 14, wherein a horizontal period in which a data signal is supplied to the pixel includes a first period, a second period, a third period, and a fourth period, wherein the data driver supplies a voltage of a reference power source to the j-th data line during the first period to the third period, and supplies a voltage of the data signal to the j-th data line during the fourth period, wherein the scan driver supplies the enable first scan signal to the i-th first scan line during the first period to the fourth period, and wherein the emission driver supplies the disable emission control signal to the i-th emission control line during the first period and the second period.

16. The display device of claim 15, wherein the voltage of the reference power source is set to a higher voltage than the voltage of the data signal, and the voltage of the data signal is set to a voltage equal to or lower than a voltage of the second driving power source.

17. The display device of claim 15, wherein the emission driver supplies the disable emission control signal to the i-th emission control line during a portion of a previous period immediately preceding the horizontal period.

18. The display device of claim 15, wherein the emission driver supplies the disable emission control signal to the i-th emission control line during the fourth period.

19. The display device of claim 15, wherein the scan driver supplies the enable second scan signal to the i-th second scan line during the first period, the third period, and the fourth period, and supplies the enable third scan signal to the i-th third scan line during the first period and the second period.

20. The display device of claim 15, wherein the scan driver supplies the enable second scan signal to the i-th second scan line during the first period and the third period, and supplies the enable third scan signal to the i-th third scan line during the first period and the second period.

* * * * *